US008565979B2

(12) United States Patent
Linker et al.

(10) Patent No.: US 8,565,979 B2
(45) Date of Patent: Oct. 22, 2013

(54) SYSTEM AND METHOD FOR STABILIZING A SINGLE-TRACK VEHICLE

(75) Inventors: Raphael Linker, Yeshuv Eshhar-Doar-Na Misgav (IL); Uri Nenner, Herzlia (IL); Per-Olof Gutman, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 539 days.

(21) Appl. No.: 13/000,632

(22) PCT Filed: Aug. 27, 2009

(86) PCT No.: PCT/IL2009/000830
§ 371 (c)(1),
(2), (4) Date: Dec. 22, 2010

(87) PCT Pub. No.: WO2010/023668
PCT Pub. Date: Mar. 4, 2010

(65) Prior Publication Data
US 2011/0118941 A1    May 19, 2011

Related U.S. Application Data

(60) Provisional application No. 61/092,515, filed on Aug. 28, 2008.

(51) Int. Cl.
*B62D 5/04* (2006.01)
*B62D 12/00* (2006.01)
*B62D 6/00* (2006.01)

(52) U.S. Cl.
USPC ............... 701/42; 701/41; 180/446; 180/443; 180/223

(58) Field of Classification Search
USPC .............. 701/41, 42; 180/218, 252, 253, 443, 180/446, 219, 220, 223
See application file for complete search history.

(56) References Cited

U.S. PATENT DOCUMENTS

| | | | |
|---|---|---|---|
| 7,006,901 B2* | 2/2006 | Wang | 701/1 |
| 7,648,000 B2* | 1/2010 | Kimura | 180/219 |
| 2005/0197994 A1 | 9/2005 | Fujii et al. | |
| 2006/0085111 A1* | 4/2006 | Kojima | 701/38 |

(Continued)

FOREIGN PATENT DOCUMENTS

| | | |
|---|---|---|
| EP | 1769990 | 4/2007 |
| EP | 1780109 | 5/2007 |

(Continued)

OTHER PUBLICATIONS

Limebeer et al., "Bicycles, Motorcycles, and Models" IEEE Control Systems Magazine, Oct. 2006, p. 34-61.*
International Search Report and the Written Opinion Dated Dec. 21, 2009 From the International Searching Authority Re.: Application No. PCT/IL2009/000830.

(Continued)

*Primary Examiner* — Christine Behncke

(57) ABSTRACT

A system for stabilizing a single-track vehicle including a front assembly and a rear assembly, said system comprising a robust controller including an inner loop which closes on a roll angular rate $\dot{\chi}$ of said rear assembly and reduces parametric uncertainty associated with said vehicle, and an outer loop which closes on a roll angle $\chi$ of said rear assembly, and wherein the robust controller outputs a steering torque signal for controlling a steering angle in said front assembly; a roll angle sensor for measuring the roll angle in the rear assembly; a roll rate gyro for measuring the roll angular rate in the rear assembly; and a motor for applying the steering angle to said front assembly responsive to the steering torque signal.

21 Claims, 24 Drawing Sheets

(56) References Cited

U.S. PATENT DOCUMENTS

2007/0010919 A1    1/2007    Ammon et al.
2008/0249684 A1    10/2008    Hirata et al.

FOREIGN PATENT DOCUMENTS

| | | |
|---|---|---|
| JP | 7215258 | 8/1995 |
| JP | 2005-271815 | 10/2005 |
| WO | WO 2010/023668 | 3/2010 |

OTHER PUBLICATIONS

International Preliminary Report on Patentability Dated Mar. 10, 2011 From the International Bureau of WIPO Re.: Application No. PCT/IL2009/000830.

* cited by examiner ial filing# SYSTEM AND METHOD FOR STABILIZING A SINGLE-TRACK VEHICLE

RELATED APPLICATIONS

This application is a National Phase of PCT Patent Application No. PCT/IL2009/000830 having International filing date of Aug. 27, 2009, which claims the benefit of U.S. Provisional Patent Application No. 61/092,515 filed on Aug. 28, 2008. The contents of the above applications are all incorporated herein by reference.

FIELD AND BACKGROUND OF THE INVENTION

The present invention, in some embodiments thereof, relates to a closed-loop control system and, more particularly, but not exclusively, to a system and a method for stabilizing a single-track vehicle.

The single-track vehicle is a two-wheeled vehicle which generally creates a single track when moving straight ahead. The track of a front wheel and a rear wheel may follow different paths generally while turning or due to misalignment. Single-track vehicles may include, for example, a motorcycle, a scooter, a moped, a motorized bicycle and a bicycle.

Motorcycles are a fascinating mean of transportation, and have generally stimulated the imagination of men and women alike. In addition to offering a ride which is highly enjoyable, motorcycles occupy less space than cars and so contribute to a reduction in traffic load. In addition, motorcycles produce less pollution than cars.

Motorcycles are generally considered more dangerous than cars partly due to their relative instability. This instability is generally associated with a lateral displacement of a center of mass of the motorcycle from over the motorcycle wheels while stationary and/or in motion. Their instability also generally makes them less intuitive to operate, requiring that a motorcycle rider have a certain amount of motorcycle riding skill and training.

Numerous devices are known in the art which attempt to control the instability of a motorcycle.

US Patent Application Publication US 2008/0249684 A1 "OVERTURN PREVENTION CONTROL DEVICE FOR TWO-WHEEL VEHICLE", relates to "An overturn prevention control device for a two-wheel vehicle having a vehicle body, a front wheel, an actuator that steers the front wheel, a rear wheel, and a rear-wheel driving portion, includes an angular velocity sensor and a control unit arranged to output a steering angle command signal for controlling the actuator. The angular velocity sensor includes a detection axis, is mounted on the vehicle body such that the detection axis is downwardly inclined at a predetermined angle relative to a forward direction of the vehicle body, and detects an angular velocity about the detection axis. The angular velocity detected by the angular velocity sensor includes an angular velocity in a lateral direction of inclination and an angular velocity in an azimuthal direction. The zero-set error and offset noise are incorporated into the azimuth angle command. Thus, the two-wheel vehicle can be prevented from overturning."

US Patent Application Publication US 2007/0010919 A1 "TILT REGULATION DEVICE AND METHOD FOR REGULATING VEHICLE TILT" relates to "A tilt regulating device (16) for a vehicle (10), with detecting means (20) for detecting a roll velocity signal ({dot over ($\kappa$)}), representing the roll velocity of the vehicle (10), and for detecting a set steering angle signal ($\delta_L^{SET}$) with regulating means (21, 29, 30) for generating a steering signal ($\delta_L$) on the basis of the roll velocity signal ({dot over ($\kappa$)}) and the set steering angle signal ($\delta_L^{set}$), and with output means (31) for outputting the steering signal ($\delta_L$) to a steering actuator (15) for steering one or more wheels (11) of at least one axle of the vehicle (10). It is proposed that tilt regulating device (16) activates the steering actuator (15) by means of the steering signal ($\delta_L$) in such a way that, at least for a certain time, the vehicle (10) is kept in a single-track driving mode."

US Patent Application Publication US 2005/0197994 A1 "INTELLIGENT ROBUST CONTROL SYSTEM FOR MOTORCYCLE USING SOFT COMPUTING OPTIMIZER" relates to "A Soft Computing (SC) optimizer for designing a Knowledge Base (KB) to be used in a control system for controlling a motorcycle is described. In one embodiment, a simulation model of the motorcycle and rider control is used. In one embodiment, the simulation model includes a feedforward rider model. The SC optimizer includes a fuzzy inference engine based on a Fuzzy Neural Network (FNN). The SC Optimizer provides Fuzzy Inference System (FIS) structure selection, FIS structure optimization method selection, and teaching signal selection and generation. The user selects a fuzzy model, including one or more of: the number of input and/or output variables; the type of fuzzy inference; and the preliminary type of membership functions. A Genetic Algorithm (GA) is used to optimize linguistic variable parameters and the input-output training patterns. A GA is also used to optimize the rule base, using the fuzzy model, optimal linguistic variable parameters, and a teaching signal. The GA produces a near-optimal FNN. The near-optimal FNN can be improved using classical derivative-based optimization procedures. The FIS structure found by the GA is optimized with a fitness function based on a response of the actual plant model of the controlled plant. The SC optimizer produces a robust KB that is typically smaller that the KB produced by prior art methods."

US Patent Application Publication US 2006/0085111 A1 "ROLL ANGLE CONTROL DEVICE FOR REMOTE-CONTROLLED TOW-WHEELED VEHICLE" relates to "A rolling angle control device 21 is disposed to provide the rolling angle control device for a remote-controlled two-wheeled vehicle so as to facilitate the control of the vehicle by an operator and stabilize the posture of the remote-controlled two-wheeled vehicle in a wide speed range.

The rolling angle control device 21 is provided with a rolling angle detection means 35 to detect a rolling angle of a vehicle main body, a steering actuator 13 to apply a right- or left-rotational torque to a steering shaft or a front fork, a control means 29 that outputs an operation amount for the steering actuator based on a rolling angle detection value and a rolling angle target value from a remote control receiver so as to bring the rolling angle detection value closer to the rolling angle target value, and a steering angle detection means 50 for detecting to which at least the neutral point as a boundary the steering angle is turned left or right, wherein a caster effect control means 51 is configured such that the control means 29 controls so that a signal is applied to an operation amount for the steering actuator as follows; when a steered angle detected by the steering angle detection means is in the right direction, the right-rotational torque is applied, and, when a steered angle detected by the steering angle detection."

Additional background art includes EP1769990A "Slip control system for a single track vehicle and motor cycle with such a system"; JP2005271815A "AUTONOMOUS TRAVELLING TYPE MOTORCYCLE AND AUTONOMOUS CONTROL METHOD"; JP2006020652A "ROLL ANGLE CONTROLLING DEVICE FOR RADIO CONTROLLED MODEL, AND RADIO CONTROLLED MODEL BICYCLE"; KR200206602 A "UNMANNED MOTOR BICYCLE BY USING GYRO"; and JP7215258A "MOTORCYCLE".

SUMMARY OF THE INVENTION

According to an aspect of some embodiments of the present invention there is provided a system for stabilizing a single-track vehicle including a front assembly and a rear assembly, the system comprising a robust controller, optionally in a cascade control configuration, the robust controller including an inner loop which closes on a roll angular rate $\dot{\chi}$ of the rear assembly and reduces parametric uncertainty associated with the vehicle, and an outer loop which closes on a roll angle $\chi$ of the rear assembly, and wherein the robust controller outputs a steering torque signal for controlling a steering angle in the front assembly; a roll angle sensor for measuring the roll angle in the rear assembly; a roll rate gyro for measuring the roll angular rate in the rear assembly; and a motor for applying the steering angle to the front assembly responsive to the steering torque signal.

According to some embodiments of the present invention, the inner loop includes a plant comprising known parameters of the motor. Optionally, the inner loop includes a plant comprising known parameters of the vehicle. Additionally or alternatively, the inner loop includes a plant comprising unknown parameters of the vehicle.

According to some embodiments of the present invention, the outer loop includes a plant comprising an integrator.

According to some embodiments of the present invention, the robust controller includes a prefilter.

According to an aspect of some embodiments of the present invention there is provided a method for stabilizing a single-track vehicle including a front assembly and a rear assembly, the method comprising closing on a roll angular rate $\dot{\chi}$ of said rear assembly and reducing parametric uncertainty associated with the vehicle, in an inner loop of a robust controller, optionally in a cascaded control configuration; closing on a roll angle $\chi$ of the rear assembly in an outer loop of the robust controller, optionally in the cascaded control configuration; producing a steering torque signal for controlling a steering angle in the front assembly; measuring the roll angle in the rear assembly; measuring the roll angular rate in the rear assembly; and applying the steering angle to the front assembly responsive to the steering torque signal.

According to some embodiments of the present invention, the method further comprises applying a reference roll angle step input to the robust controller. Optionally, the method further comprises prefiltering the reference roll angle step input. Optionally, the method further comprises converting the reference roll angle step input from a time domain to a frequency domain.

According to some embodiments of the present invention, the method further comprises including known parameters of the vehicle in a plant in the inner loop. Optionally, the method further comprises including uncertain parameters of the vehicle in a plant in the inner loop.

According to some embodiments of the present invention, the method further comprises including a plant comprising an integrator in the outer loop. Optionally, the method further comprises including known parameters of the motor in a plant in the inner loop.

According to some embodiments of the present invention, the parametric uncertainty associated with the vehicle includes variations in physical parameters in the vehicle. Optionally, the parametric uncertainty associated with the vehicle includes variations in an operating range of forward velocity.

According to an aspect of some embodiments of the present invention, there is provided a single-track vehicle including a front assembly and a rear assembly, the vehicle comprising a system for stabilizing a single-track vehicle including a front assembly and a rear assembly, the system comprising a robust controller, optionally in a cascade control configuration, the robust controller including an inner loop which closes on a roll angular rate $\dot{\chi}$ of said rear assembly and reduces parametric uncertainty associated with said vehicle, and an outer loop which closes on a roll angle $\chi$ of said rear assembly, and wherein the robust controller outputs a steering torque signal for controlling a steering angle in the front assembly; a roll angle sensor for measuring the roll angle in the rear assembly; a roll rate gyro for measuring the roll angular rate in the rear assembly; and a motor for applying the steering angle to the front assembly responsive to the steering torque signal.

According to some embodiments of the present invention, the single-track vehicle further comprises a throttle actuator for controlling gas in an engine included in the vehicle. Optionally, the single-track vehicle further comprises a brake actuator for braking the vehicle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
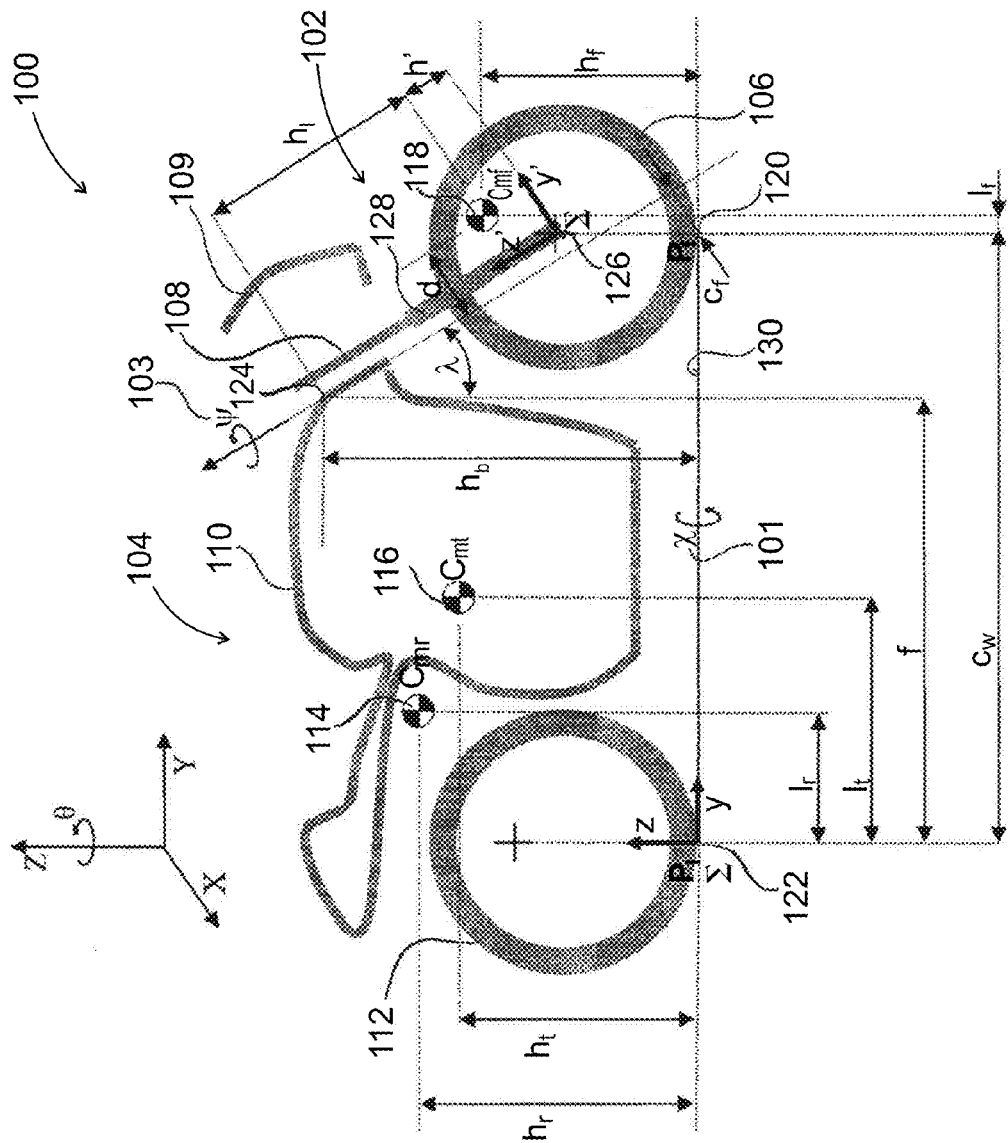
FIG. 1 schematically illustrates an exemplary motorcycle including associated physical parameters used to develop the linear equations describing motion of the motorcycle, in accordance with an embodiment of the present invention.

The present invention, in some embodiments thereof, relates to a closed-loop control system and, more particularly, but not exclusively, to a system and a method for stabilizing a motorized single-track vehicle.

A stabilizing system for a motorized single-track vehicle may have potentially numerous beneficial applications. For example, in one application, it may assist in preventing a vehicle rider from being involved in an accident. A typical response time of a human rider is about three quarters of a second. An emergency automatic control system, operating briefly in cases of fast destabilizing disturbances, such as the front wheel momentary losing traction due to an oily surface on the road, may save lives. In another exemplary application, an unmanned motorcycle robot incorporating a closed loop control scheme may be used for motorcycle safety research oriented experiments, potentially eliminating a need for a human test rider to be exposed to potential harm. In even another exemplary application, the motorcycle may include be electronically controlled wherein a rider drives it "by wire" (for example, steers a steering-wheel as is in a car, or optionally steering handles as in a motorcycle, and a steering control systems sets the desired heading while maintaining roll-stability).

An aspect of some embodiments of the present invention relates to a system and a method for stabilizing a single-track vehicle while in motion, such as, for example a moving motorcycle, using robust controller tracking of a desired roll angle reference. In some embodiments of the present invention, a stabilizing system may include a robust controller whose design is based on QFT (Quantitative Feedback Theory). Synthesis of the controller may be done in the frequency domain while taking into account parametric uncertainty (although a transfer function that represents the motorcycle dynamic model may be known, many of its parameters may include a range rather than a specified value). These parametric uncertainties may be due, for example, to variations in a forward velocity of the motorcycle while moving. Optionally, the parametric uncertainties may be due to variations in physical measurements made of certain mechanical parameters of the motorcycle (detailed further on below) which may vary, for example, up to +15%. Optionally, up to 20%. Additionally or alternatively, up to 25%. In the frequency domain, the parametric uncertainty may be translated into frequency dependant sets in a complex open loop frequency function domain (open loop templates).

Due to uncertainty in a plant (motorcycle motion dynamics), the system may be represented by a family of plants rather than by a single expression. Instead of solving a control design problem simultaneously for all plant cases, the problem may be transformed into a conventional feedback design problem for a single nominal plant, where Horowitz-Sidi bounds may be plotted in a Nichols Chart as frequency dependent constraints. These bounds may be computed for a set of user-defined frequencies, and may be presented as graphical constraints that the nominal loop has to fulfill in order for the controlled system to be stable and meet the specifications for all plant cases. Closed loop specifications are given in the frequency domain. Optionally, time domain response specifications are translated into frequency domain specifications.

In some embodiments of the present invention, a feedback compensator G(s) may be used to reduce closed loop uncertainty and reject disturbances while a Prefilter F(s) may be used to shape a closed loop transfer function from reference to output. Optionally, G(s) may be synthesized by loop shaping in the Nichols chart, until a suitable controller is reached. Optionally, G(s) may be synthesized by other closed loop feedback control methods.

In an embodiment of the present invention, a steering torque is used as a control input for a Single Input Single Output (SISO) load sharing system which produces a roll angle as an output. Optionally, a steering angle may be used as a control input. Optionally, lateral shifting of mass may be used as a control input. Additionally or alternatively, a steering input (torque and/or angle) and shifting of mass may be control inputs to a Multiple Input Single Output (MISO) load sharing system.

In an embodiment of the present invention, a dynamic roll angle sensor and a roll rate gyro may be connected, optionally in a cascade control configuration, wherein an inner loop is closed on the roll rate and an outer loop is closed on the roll angle. Optionally, a roll angle reference is provided by a user, which may be a motorcycle rider or a remote user (not riding the motorcycle). Optionally, uncertainty reduction associated with a non-linear behavior of the motorcycle and with stabilizing the motorcycle over a wide velocity range may be done by the inner loop alone (a transfer function from roll rate to roll angle is an integrator without uncertainty). This leads to a lower controller bandwidth in the inner loop, optionally avoiding medium frequency oscillatory modes associated with the motorcycle frame that are beyond the cascaded control system bandwidth. Optionally, a GPS instrument may be used to provide the roll angle reference command. Optionally, an imaging instrument such as a camera may be used to provide the roll angle reference command.

A pair of linear equations describing the motion of the motorcycle may be developed and included in the cascaded control configuration of the stabilizing system. A complete derivation of the linear equation is described in Provisional Application No. 61/092,515 referenced in the section Related Applications. The first equation determines ψ, the steering angle of a front assembly of the motorcycle relative to a rear assembly of the motorcycle, and the second equation determines χ, the roll angle of the motorcycle relative to a perpendicular plane. The front assembly includes a front fork, steering shaft, and a front wheel. A rear assembly includes a rear frame, motor, and a rear wheel. The equations are as follows:

$$\psi(s) = \frac{p_1(s)}{p_5(s)} M_\psi(s) - \frac{p_4(s)}{p_5(s)} M_\chi(s)$$

$$\chi(s) = [p_4(s)/p_1(s)]\psi(s) + [1/p_1(s)]M_x(s)$$

where;

$M_\psi$ is the steering torque, a control input of the inner loop;

$M_\chi$ is a disturbance roll torque acting on the rear assembly caused, for example, by a sudden gust of wind; and $$p_1(s) = M_{\chi\chi}s^2 + C_{\chi\chi}s + K_{\chi\chi}$$

$$p_2(s) = M_{\chi\psi}s^2 + C_{\chi\psi}s + K_{\chi\psi}$$

$$p_3(s) = M_{\psi\eta\psi}s^2 + C_{\psi\eta\psi}s + K_{\psi\eta\psi}$$

$$p_4(s) = M_{\psi\chi}s^2 + C_{\psi\chi}s + K_{\psi\chi}$$

$$p_5(s) = p_1(s) \cdot p_3(s) - p_2(s) \cdot p_4(s)$$

where the coefficients $M_{ij}$, $C_{ij}$ and $K_{ij}$ are inertial, damping and spring coefficients, respectively, and are a function of the dimensions of the motorcycle, its physical properties, and its forward velocity V when in motion In some embodiments of the present invention, the system may be used to stabilize an unmanned motorcycle. The motorcycle may be guided by remote control, an on-board robust controller (micro-controller) receiving throttle, brake, and roll angle reference commands from a user. Measurements of a position of the throttle, brake actuators, roll angle and roll angular rate may be obtained from on-board sensors and processed by the micro-controller.

In some embodiments of the invention, the unmanned motorcycle may be used as a rider-less test motorcycle for motorcycle safety testing. Optionally, the unmanned motorcycle may be used as a robot for surveillance purposes by attaching a camera or other imaging device. Optionally, the unmanned motor may be used in applications where a rider may be exposed to danger such as for example, in military applications, homeland security applications, private and industrial security applications, and other applications suitably adapted for a mobile robot.

The inventor constructed an experimental prototype of an unmanned single-track vehicle based on a 50 cc scooter. An experimental goal was for the scooter to travel at velocities ranging from 2.5 to 6.5 m/sec while tracking a reference roll angle and maintaining stability (maintaining its balance). Synthesizing of the stabilizing system was done using QSYN—The Toolbox for Robust Control Systems Design for use with MATLAB. Optionally, other numerical computing systems and/or methods may be used. After successful simulations, the stabilizing system was implemented on a radio-controlled unmanned scooter (the 50 cc scooter) built for the experiment and the prototype performed successfully.

List of Symbols—The following Symbols may be used Throughout this Disclosure, or in Documents Referenced in this Disclosure.

$C_{mr}$—Point that denotes the location of the center of mass of the rear assembly.

$C_{mf}$—Point that denotes the location of the center of mass of the front assembly.

$C_{mt}$—Point that denotes the location of the center of mass of the whole motorcycle.

$c_a$—Trail, which is the ground level distance from $P_f$ to $P_a$ [m].

$c_f$—"Mechanical trail", which is the perpendicular distance (backwards) from the steering axis to $P_f$. It is equal to $(\cos(\lambda) \cdot c_a)$ [m].

$c_w$—"Wheelbase", which is the distance between the rear and front contact points ($P_r$ and $P_f$) [m].

d—Perpendicular distance (forward) from the steering axis to $C_{mf}$. d is also given by $d = h_f \sin\lambda + l_j \cos\lambda - c_f$.

$e_m(t)$—Back emf generated by the armature of the steering motor spinning at an angular velocity $\omega_m(t)$.

$h_b$—Height of the front fork hinge point [m].

$h_1$—Distance, parallel to the steering axis, from the front fork hinge point to the front axle [m].

$h_1$—Distance, parallel to the steering axis, from the front center of mass to the front axle [m].

$h_f$—Height of the front assembly center of mass ($C_{mf}$) relative to the front wheel contact point ($P_f$) [m].

$h_r$—Height of the rear assembly center of mass ($C_{mr}$) relative to the rear wheel contact point ($P_r$) [m].

$h_t$—Height of the total motorcycle center of mass ($C_{mt}$) relative to the rear wheel contact point ($P_r$) [m].

i(t)—Current flowing in the steering motor armature wire [A].

$Ixx_1$—Moment of inertia of the front wheel about the wheel axle [kgm$^2$].

Ixx2—Moment of inertia of the rear wheel about the wheel axle [kgm$^2$].

$Iyy_f$—y'y' moment of inertia of the front assembly, measured about front center of mass [kgm$^2$].

$Iyz_f$—y'z' product of inertia of the front assembly, measured about front center of mass [kgm$^2$].

$Izz_f$—z'z' moment of inertia of the front assembly, measured about front center of mass [kgm$^2$].

$Iyy_r$—yy moment of inertia of the front assembly, measured about rear center of mass [kgm$^2$].

$Iyz_r$—yz product of inertia of the front assembly, measured about rear center of mass [kgm$^2$].

$Izz_r$—zz moment of inertia of the front assembly, measured about rear center of mass [kgm$^2$].

$J_m$—Steering motor armature inertia [Kgm$^2$].

K—Spring coefficient of the serial combination of the steering transmission belt and shaft [N/m].

$k_b$—Steering motor back emf constant [V/(rad/s)].

$k_t$—Steering motor torque constant [Nm/A].

L—Steering motor inductance [Henry].

$l_f$—Distance (forward) from the front wheel contact point ($P_f$) to the front assembly center of mass ($C_{mf}$) [m].

$l_r$—Distance (forward) from the front wheel contact point ($P_r$) to the front assembly center of mass ($C_{mr}$) [m].

$l_t$ Distance (forward) from the rear wheel contact point ($P_r$) to the total motorcycle center of mass ($C_{mt}$) [m].

$m_f$—Mass of front assembly [kg].

$m_r$—Mass of rear assembly [kg].

$m_t$—Total mass of entire motorcycle [kg].

$M_\psi$—Steering torque—this is the control input of the inner loop [Nm].

$M_\chi$—Disturbance roll torque acting on the rear assembly [Nm].

N—Transmission reduction of the combination of steering gearhead and transmission belt.

$P_r$—Rear contact point (the point where the rear wheel touches the ground).

$P_f$—Front contact point (the point where the front wheel touches the ground).

$P_a$—Intersection point of the steering axis with the road plane.

R—Steering motor armature resistance [Ω].

$\tilde{R}$—Rotation matrix from $\Sigma_1$ to $\Sigma_2$.

$r_f$—Front wheel radius [m].

$r_r$—Rear wheel radius [m].

T(t)—Torque generated by the steering motor armature [Nm].

$T_L(t)$—Load torque. In the case of the unmanned motorcycle, this is the steering torque, hence $T_L = M_\psi(t)$.

V—Forward velocity [m/s].

$V_{in}(t)$—Steering motor voltage [volts].

λ—Steering head angle (also called "rake angle") [deg].

μ—Pitch angle, which is the rotation angle about the x axis of the rear frame coordinate system [rad].

Δ—Effective steering angle, represents the projection of this actual angle onto the road plane z=0. It is equal to $(\cos(\lambda) \cdot \psi)$ [rad].

$\Sigma_1$—Rear coordinate system (axis: x,y,z). Attached to the rear assembly, its origin is at the rear contact point $P_r$.

$\Sigma_2$—Front coordinate system (axis: x',y',z'). Attached to the front assembly, its origin is at the center of the front wheel.

$\omega_m(t)$—Steering motor armature angular velocity [rad/s].
$\theta$—Heading angle of the rear frame [rad].
$\theta_m(t)$—Steering motor armature angle [rad].
$\psi(t)$—Steering angle [rad].
$\chi$—Roll angle of the rear frame [rad].
$\Omega_1$—Spin angular velocity of the front wheel [rad/sec].
$\Omega_2$—Spin angular velocity of the rear wheel [rad/sec].
$\Omega_3$—Spin angular velocity of the rotor of the motorcycle motor [rad/sec].

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

Referring now to the drawings, FIG. 1 schematically illustrates an exemplary motorcycle 100 including associated physical parameters used to develop the linear equations describing motion of the motorcycle, in accordance with an embodiment of the present invention. Motorcycle 100 includes a front assembly 102 and rear assembly 104. Front assembly include a steering shaft 108 to which handles 109 are attached, a front fork 128 to which the steering shaft is attached at one end, and a front wheel 106 attached to the front fork at an axle 126. Rear assembly 104 includes a motorcycle frame 114, a motor (not shown) attached to the frame, and a rear wheel 112 attached to the frame. Front assembly 102 connects to rear assembly 104 at a hinge point 124.

A center of mass for motorcycle 100 is shown at $c_{mt}$ 116, a center of mass for front assembly is shown at $c_{mf}$ 118, and a center of mass for the rear assembly is shown at $c_{mr}$ 114. A point of contact of front wheel 106 with a ground 130 is shown at $P_f$ 120. A point of contact of rear wheel 112 with ground 130 is shown at $P_r$ 122.

The linear equations of motion for motorcycle 100 for a $\chi$ 101 and $\psi$ 103, which define a mathematical model of a plant composed of motorcycle dynamics and used to synthesize a controller (not shown) for stabilizing the motorcycle, may be determined to be as follows:

$$\psi(s) = \frac{p_1(s)}{p_5(s)} M_\psi(s) - \frac{p_4(s)}{p_5(s)} M_\chi(s)$$

$$\chi(s) = [p_4(s)/p_1(s)]\psi(s) + [1/p_1(s)]M_\chi(s)$$

where;

$p_1(s) = M_{\chi\chi} s^2 + C_{\chi\chi} s + K_{\chi\chi}$ $p_2(s) = M_{\chi\psi} s^2 + C_{\chi\psi} s + K_{\chi\psi}$ $p_3(s) = M_{\psi\psi} s^2 + C_{\psi\psi} s + K_{\psi\psi}$ $p_4(s) = M_{\psi\chi} s^2 + C_{\psi\chi} s + K_{\psi\chi}$ $p_5(s) = p_1(s) \cdot p_3(s) - p_2(s) \cdot p_4(s)$ $M_{\chi\chi} = T_{yy}$ $M_{\chi\psi} = F'_{\lambda y} + T_{yz} \frac{C_f}{C_w}$ $C_{\chi\chi} = 0$ $C_{\chi\psi} = V\left(T_{yz}\frac{\cos\lambda}{C_w} - \frac{C_f}{C_w}\left(\frac{I_{xx_1}}{r_f} + \frac{I_{xx_2}}{r_r} + n\frac{I_{xx_3}}{r_r}\right) - \frac{I_{xx_1}}{r_f}\cos\lambda - m_t h_t \frac{C_f}{C_w}\right)$ $K_{\chi\chi} = -m_t g h_t$ $K_{\chi\psi} = +V^2\left(-\frac{\cos\lambda}{C_w}\left(\frac{I_{xx_1}}{r_f} + \frac{I_{xx_2}}{r_r} + n\frac{I_{xx_3}}{r_r}\right) - m_t h_t \frac{\cos\lambda}{C_w}\right) + gv$ -continued $M_{\psi\chi} = F'_{\lambda y} + T_{yz}\frac{C_f}{C_w}$ $M_{\psi\psi} = F'_{\lambda\lambda} + 2\frac{C_f}{C_w}F''_{\lambda z} + \frac{C_f^2}{C_w^2}T_{zz}$ $C_{\psi\chi} = V\left(\frac{I_{xx_1}}{r_f}\cos\lambda + \left(\frac{I_{xx_1}}{r_f} + \frac{I_{xx_2}}{r_r} + n\frac{I_{xx_3}}{r_r}\right)\frac{C_f}{C_w}\right)$ $C_{\psi\psi} = V\left(\frac{\cos\lambda}{C_w}F''_{\lambda z} + \frac{C_f}{C_w}\left(\frac{\cos\lambda}{C_w}T_{zz} + v\right)\right)$ $K_{\psi\chi} = gv$ $K_{\psi\psi} = -gv\sin\lambda + V^2\left(\frac{I_{xx_1}}{r_f}\frac{\cos\lambda}{C_w}\sin\lambda + \frac{\cos\lambda}{C_w}v\right)$ and, $T_{yy} = I_{yy_r} + m_r h_r^2 + F'_{yy} + m_f h_f^2$ $T_{yz} = -I_{yz_r} - m_r l_r h_r + F'_{yz} - m_f(C_w + l_f)h_f$ $T_{zz} = I_{zz_r} + m_r l_r^2 + F'_{zz} + m_f(C_w + l_f)^2$ $F'_{\lambda y} = -I_{yz_f}\cos\lambda - I_{zz_f}\sin\lambda - m_f h_f d$ $F''_{\lambda z} = -I_{yz_f}\sin\lambda + I_{zz_f}\cos\lambda + m_f(C_w + l_f)d$ Furthermore, equations for $\dot\psi$ and $\dot\chi$ (which are used in an inner control loop as will be described later on) are as follows:

$$\dot\psi(s) = \frac{s \cdot p_1(s)}{p_5(s)} M_\psi(s) - \frac{s \cdot p_4(s)}{p_5(s)} M_\chi(s)$$

$$\dot\chi(s) = \frac{p_2(s)}{p_1(s)}\dot\psi(s) + \frac{s}{p_1(s)}M_\chi(s)$$

Figure 2:
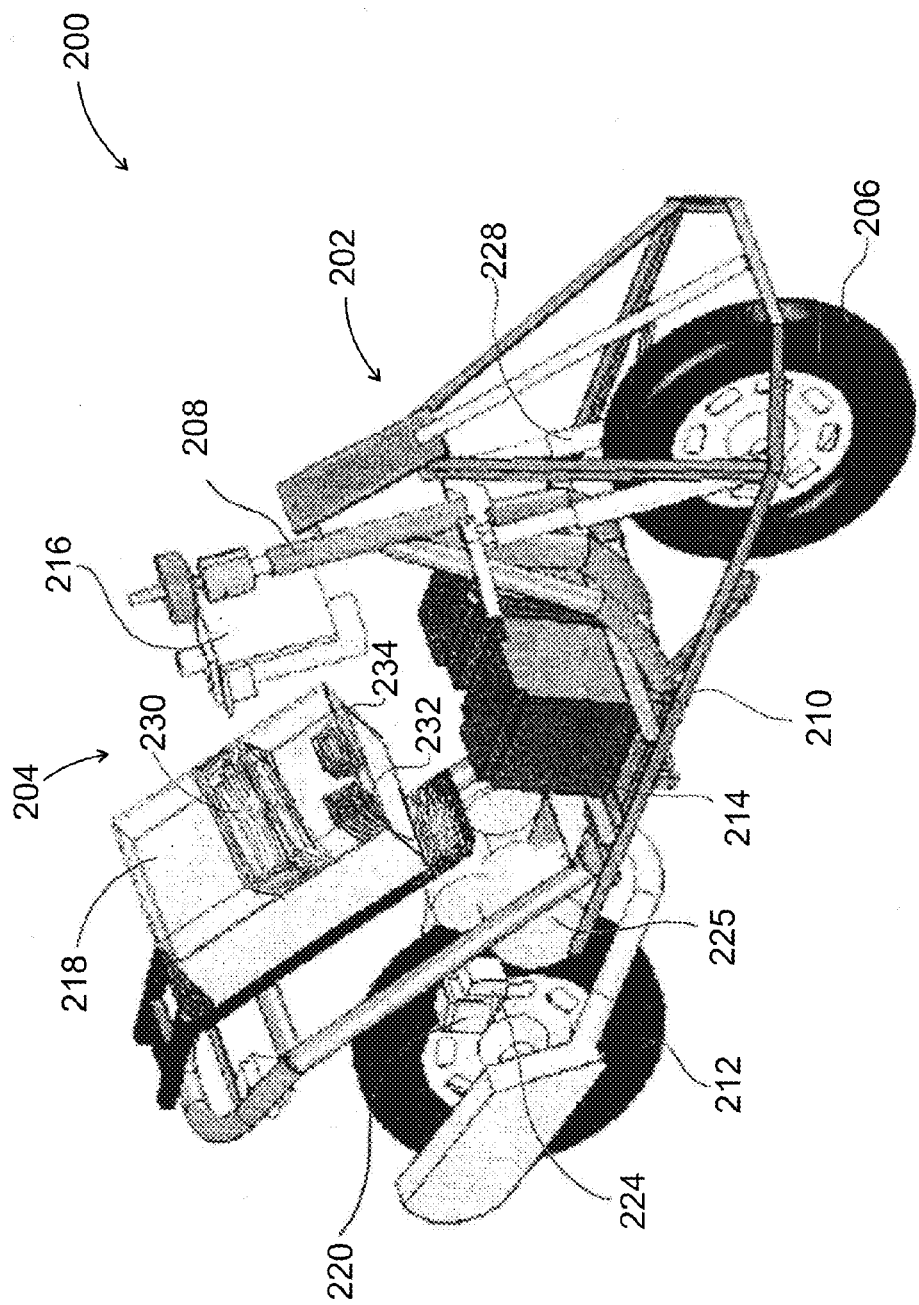
FIG. 2 schematically illustrates an exemplary unmanned motorcycle, in accordance with an embodiment of the present invention.

Reference is made to FIG. 2 which schematically illustrates an exemplary unmanned motorcycle 200, in accordance with an embodiment of the present invention. Unmanned motorcycle 200 may be similar to motorcycle 100 shown in FIG. 1, and includes a stabilization system 218 comprising a robust controller 230 (micro-controller) and associated electronics, a roll angle sensor 232, and a roll rate gyro sensor 234. Motorcycle 200 further includes a front assembly 202 which includes a steering shaft 208, a front fork 228, and a front wheel 206; and a rear assembly 204 which includes a frame 210, a motor 225 (engine), and a rear wheel 220. Front assembly 202 and rear assembly 204, including steering shaft 208, front fork 228, front wheel 206, frame 210, and rear wheel 220, may be similar to that shown in FIG. 1 at 102, 104, 108, 128, 106, 110, and 120.

In accordance with an embodiment of the present invention, Motorcycle 200 is stabilized by stabilizing system 218 with micro-controller 230 solving the linear equations of motion described in FIG. 1. Motorcycle 200 is guided by remote control, micro-controller 230 receiving throttle, brake, and roll angle reference commands from a user. Measurements of a position of a throttle (not shown) for gas, a position of a brake (not shown), roll angle, and roll angular rate are obtained from a throttle actuator 224, a brake actuator 220, roll angle sensor 232, and roll rate sensor 234, respectively, all mounted on-board motorcycle 200. Steering of motorcycle 200 is done by a steering motor 216 connected to steering shaft 208. Responsive to the commands received by remote control from the user and the obtained measurements, micro-controller 230 resolves the linear equations of motion and issues a control signal to steering motor 216 for applying a required steering torque to steering shaft 208. Direct current (DC) power supply for stabilizing system 218, motor 216, brake actuator 220, and throttle actuator 224 is provided by battery 214.

In a laboratory motorcycle developed by the inventor and described in greater detail further on below, analog signals from the roll angle sensor and the angular rate sensor were acquired by the microcontroller at a 10 kHz sampling rate and averaged at 50 Hz. This sampling frequency was chosen as it is relatively high, about 40 times a closed loop bandwidth, yet sufficiently low compared to the 10 kHz sampling rate, enabling relatively smooth averaging over many sample readings. Every 20 ms, the microcontroller issued pulse width modulated (PWM) commands to the brake actuator, throttle actuator, and steering motor via appropriate H-bridges. Steering was controlled by a 24V permanent magnet DC motor with a gearhead with a 1:15 reduction ratio. The nominal torque and angular velocity at the gearhead output shaft are 10.8 [Nm] and 120 [rpm], respectively. Simulations conducted in MATLAB's Simulink showed that in order to stabilize the unmanned motorcycle, nominal values of torque and angular velocity of 21 [Nm] and 18 [rpm] are needed. A further transmission reduction was achieved by adding a timing belt and pulleys with a transmission reduction ratio of 1:3, resulting in a total reduction ratio of 1:45. This gives satisfactory nominal torque and angular velocity values of 32.4 [Nm] and 40 [rpm], respectively. Two 12V car batteries were connected in serial to produce a 24V power supply to drive the brake and throttle actuators, and the steering motor.

Figure 3:
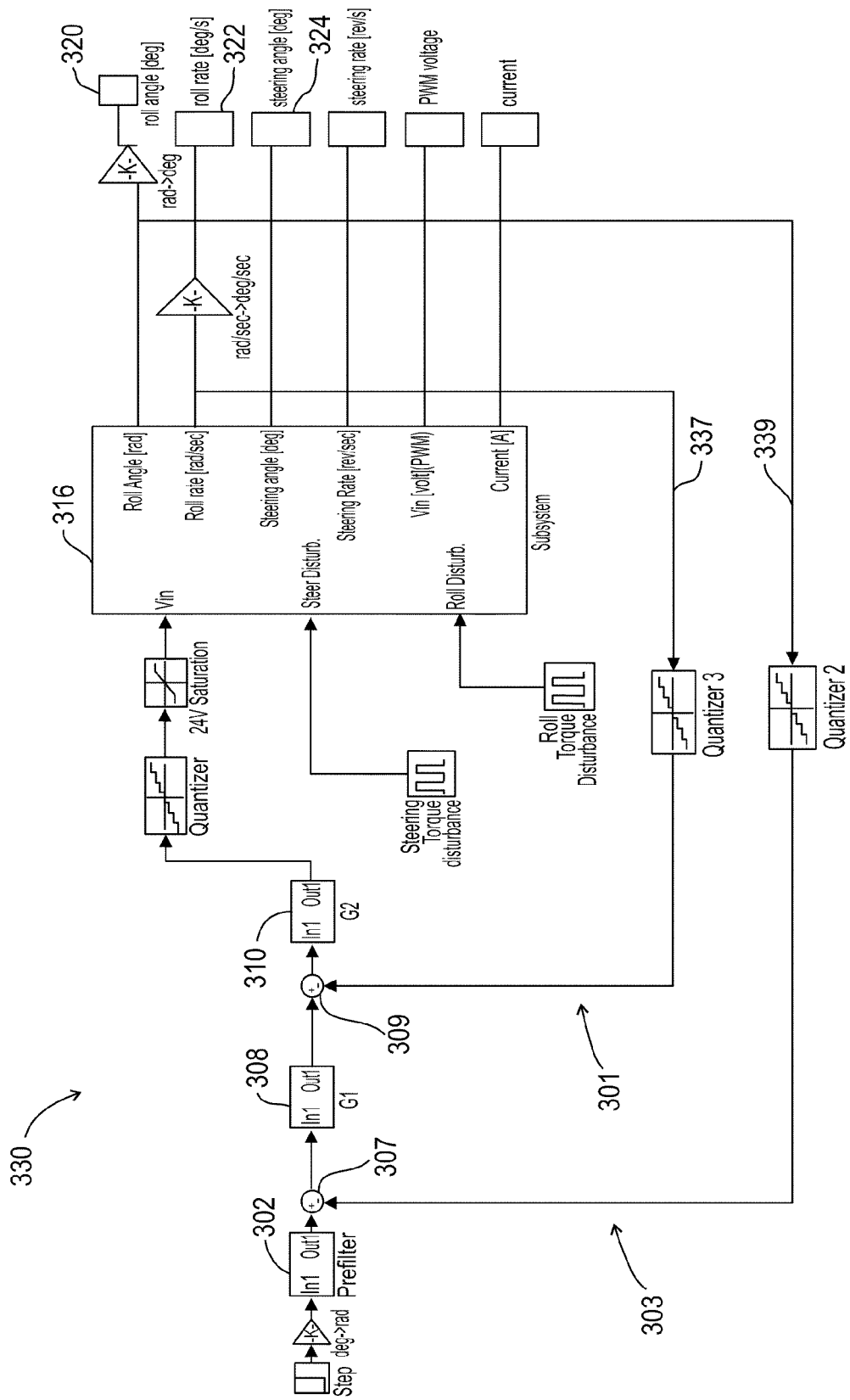
FIG. 3 schematically illustrates an exemplary functional block diagram of a closed outer loop and a closed inner loop in a robust controller used to stabilize a motorcycle, in accordance with an embodiment of the present invention.
Figure 4:
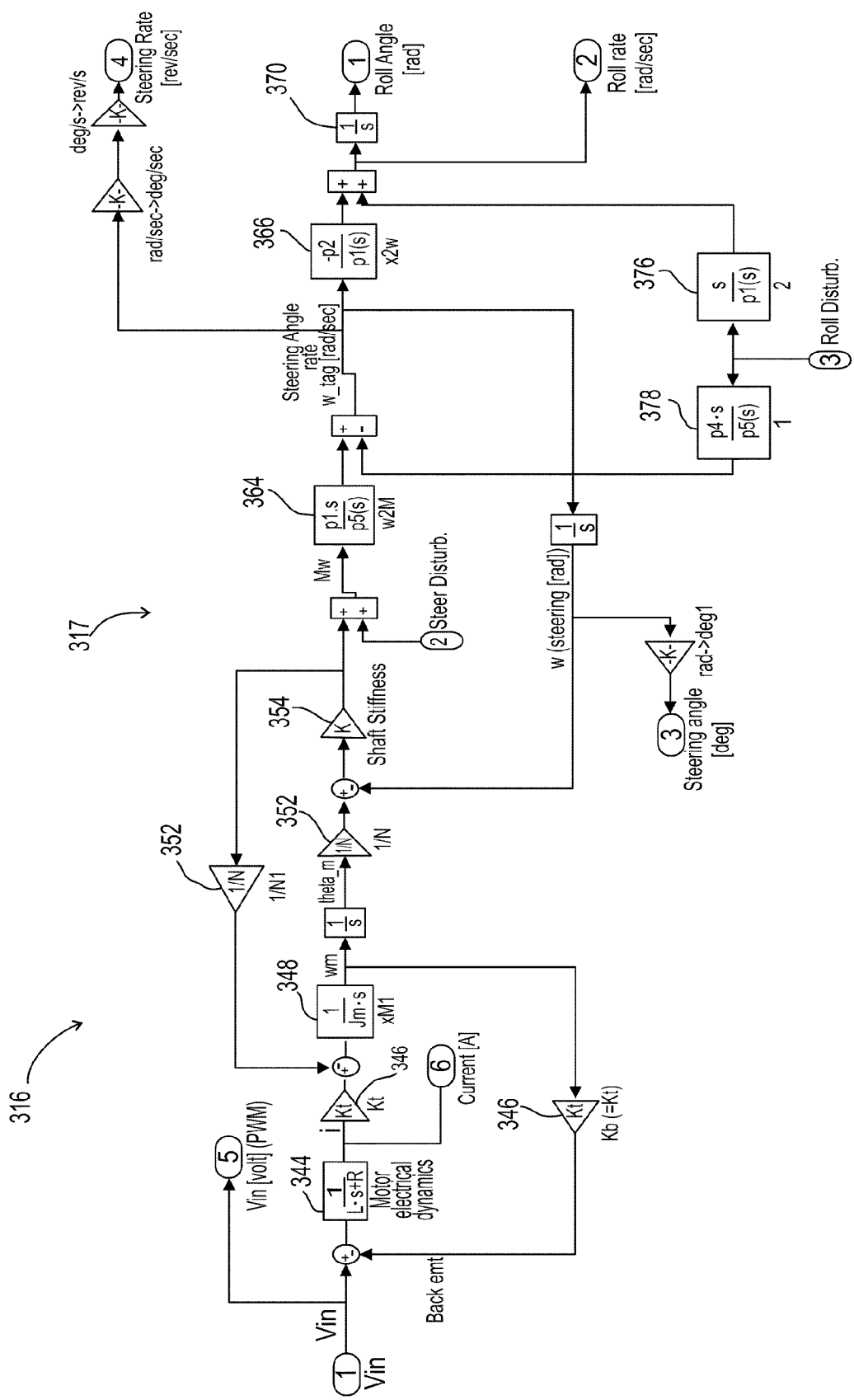
FIG. 4 schematically illustrates an exemplary functional block diagram of a first plant and a second plant included in a subsystem in the robust controller, in accordance with an embodiment of the present invention.

Reference is made to FIG. 3 which schematically illustrate an exemplary functional block diagram of an closed outer loop 303 and a closed inner loop 301 in a robust controller 330 used to stabilize a motorcycle (not shown), and to FIG. 4 which schematically illustrates an exemplary functional block diagram of a plant 317 and a plant 370 included in a subsystem 316 in the robust controller, all in accordance with an embodiment of the present invention. Robust controller 330 (microcontroller) may be similar to that shown in FIG. 2 at 230. The motorcycle may be similar to that shown in FIG. 1 at 100 or FIG. 2 at 200. In accordance with an embodiment of the present disclosure, robust controller 330 solves the linear equation of motion for motorcycle described in FIG. 1.

It should be noted that FIGS. 3 and 4 were generated by SIMULINK (modeling/simulating/analysis system which integrates with MATLAB) and include many components required by SIMULINK for modeling/simulating/analysis purposes and do not form part of a functionality of robust controller 330. Only those blocks included in the functionality of robust controller 330 are called out (numbered).

In accordance with an embodiment of the present invention, robust controller 330 comprises an inner loop 301 which closes on the roll angular rate χ 322 and reduces parametric uncertainty associated with the motorcycle, and outer loop 303 which closes on roll angle χ 320. Robust controller 330 responsively outputs a steering torque signal $M_\psi$ for controlling a steering angle in the motorcycle. Optionally, steering torque signal $M_\psi$ may be a steering angle signal 324.

Robust controller 330 includes, optionally in a cascaded configuration, a Prefilter 302 for shaping a reference roll angle signal in the frequency domain by defining its bandwidth; a first compensator G1 306 for compensating an error roll angle signal produced by a subtractor 307 subtracting a feedback roll angle signal in outer feedback loop 339 from the reference signal; a second compensator G2 310 for compensating an error roll rate (roll angular rate) signal produced by a subtractor 309 subtracting a feedback roll rate signal in inner feedback loop 337 from the compensated roll angle signal. Robust controller 330 further includes in the cascaded configuration a second plant 317 (P2) and a first plant 370 (P1), which include known and unknown parameters associated with the linear equations of motion for the motorcycle, including those associated with a DC motor which provides the steering torque. Parameters associated with the DC motor are shown in block 344 (armature inductance and armature resistance in the DC motor), block 346 (torque constant), block 348 (armature inertia), block 352 (transmission reduction of a combination of a steering gear head in the DC motor and an attached transmission belt), and block 354 (spring coefficient of a serial combination of the steering transmission belt and the steering shaft). Parameters associated with the linear equations of motion of the motorcycle are shown in blocks 364, 366, 376 and 378, respectively. Plant 370 is an integrator for converting the roll angular rate to roll angle.

Figure 5:
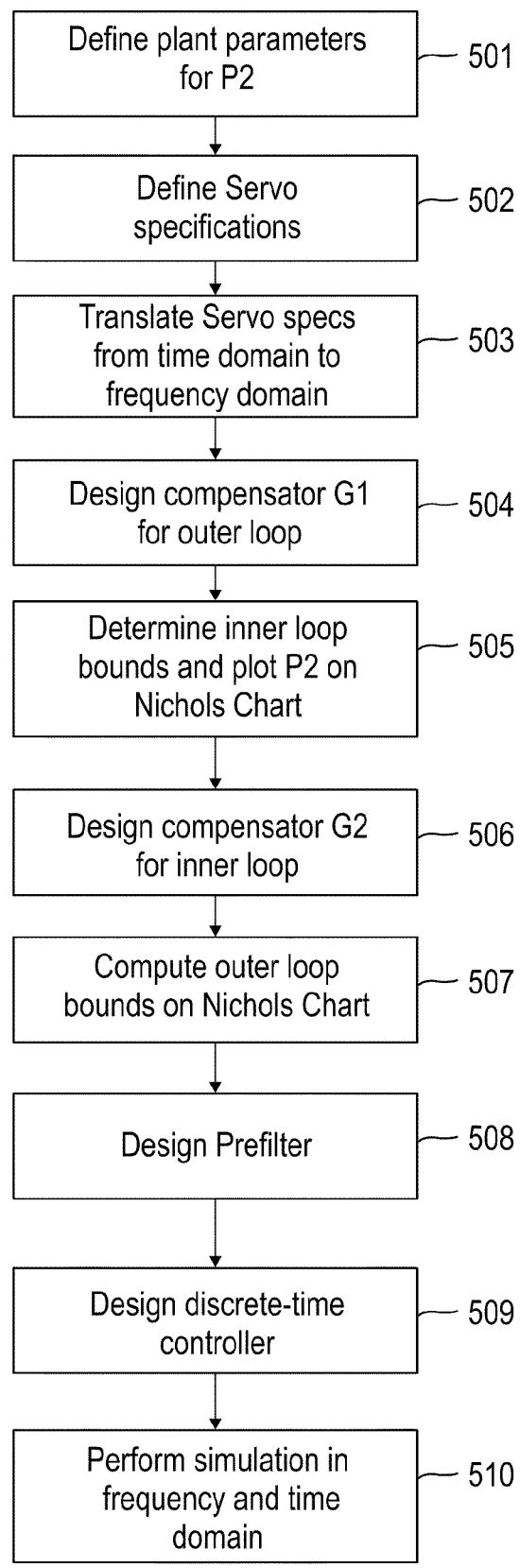
FIG. 5 illustrates a flow graph of a method for developing the robust controller shown in FIGS. 3 and 4, in accordance with an embodiment of the present invention.
Figure 6:
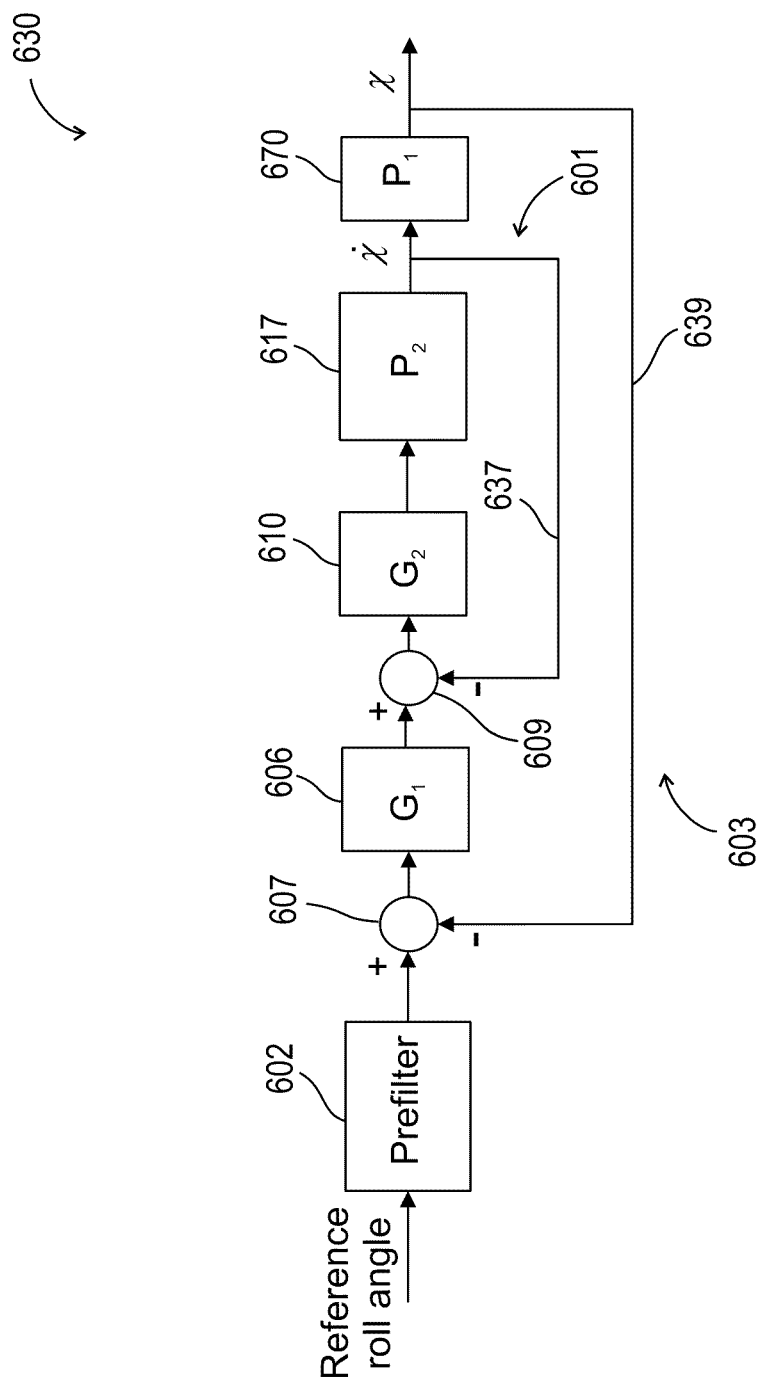
FIG. 6 schematically illustrates an exemplary robust controller with feedback inner loop and feedback outer loop used in the method of FIG. 5, in accordance with an embodiment of the present invention.

Reference is made to FIG. 5 which illustrates a flow graph of a method for developing robust controller 330 shown in FIGS. 3 and 4, in accordance with an embodiment of the present invention. Reference is also made to FIG. 6 which schematically illustrates an exemplary robust controller 600 with inner loop 601 and outer loop 603 used in the method of FIG. 5; to FIG. 7 which schematically illustrates a frequency domain plot and a time domain plot for an exemplary servo specification used in the method of FIG. 5; and to FIG. 8 which schematically illustrates an exemplary robust controller 800 with a unity closed inner loop used in the method of FIG. 5; all in accordance with an embodiment of the present invention.

AT 501, plant parameters for P2 617 in robust controller 630 are defined. Robust controller 630 including Prefilter 602, outer loop subtracter 607, first compensator G1 606, inner loop subtracter 609, second compensator G2 610, plant P2 617, plant P1 670, inner loop 601, inner feedback loop 637, outer loop 603, and outer feedback loop 639 may be similar to that shown in FIGS. 3 and 4 at 330 including 302, 307, 306, 309, 310, 317, 370, 301, 337 and 303, 339. The linear equations of motion for the motorcycle illustrated in FIG. 1 are applicable herein. Plant P1 670 is an integrator. Plant parameters for P2 617 include a DC Motor used to drive a steering shaft and a dynamics of a motorcycle. Some are exact while others are defined as uncertain ranges. In some embodiments of the present invention, the dynamics of the motorcycle are expressed by the linear equations describing the motion of motorcycle 100 in FIG. 1, optionally motorcycle 200 in FIG. 2; and the dynamics of the DC motor are given by the following (in the frequency domain):

$$T(s) = k_t \cdot i(s) \qquad (0.1)$$

$$e_m(s) = k_b \cdot \omega_m(s)$$

$$V_{in}(s) - e_m(s) = (Ls + R)i(s)$$

$$J_m s \cdot \omega(s) = T(s) - \frac{1}{N} T_L(s)$$

$$T_L(s) = K\left(\frac{\theta_m(s)}{N} - \psi(s)\right)$$

Following are the known and unknown plant parameters.
a. Known parameters:
Steering DC Motor Parameters

| Parameter | Description |
| --- | --- |
| $k_t$ | Torque constant |
| $k_b$ | Back EMF constant |
| $J_m$ | Armature inertia |
| R | Armature resistance |
| L | Armature inductance |
| N | Transmission reduction (motor gearhead and timing pulleys combined) |

Motorcycle Parameters

| Parameter | Description |
|---|---|
| $\lambda$ | Steering head angle |
| $c_f$ | Mechanical trail |
| d | See Appendix A |
| $c_w$ | Wheel base |
| $r_r$ | Rear wheel radius |
| $r_f$ | Front wheel radius |
| $l_f$ | Forward distance of the front assembly center of mass relative to the front wheel contact point |
| $h_f$ | Height of the front assembly center of mass relative to the front wheel contact point |
| $Iyz_r$ | y-z product of inertia of rear assembly, measured about rear center of mass. |
| $Iyz_f$ | y-z product of inertia of front assembly, measured about front center of mass. |
| $Ixx_2$ | Rear wheel moment of inertia, measured about wheel axis. | b. Unknown Parameters: Motorcycle unknown parameters due to uncertainty in some of the physical parameters and to the fact that the control system is required to operate over a range of forward velocity.

| Parameter | Description |
|---|---|
| V | Forward velocity |
| $l_r$ | Forward distance of the rear assembly center of mass relative to the rear wheel contact point |
| $h_r$ | Height of the rear assembly center of mass relative to the rear wheel contact point |
| $m_r$ | Mass of rear assembly |
| $m_f$ | Mass of front assembly |
| $Iyy_r$ | y-y moment of inertia of the rear assembly, measured about rear center of mass |
| $Izz_r$ | z-z moment of inertia of the rear assembly, measured about rear assembly center of mass |
| $Iyy_f$ | y-y moment of inertia of the front assembly, measured about front center of mass |
| $Izz_f$ | z-z moment of inertia of the front assembly, measured about front assembly center of mass |
| $Ixx_1$ | Front wheel moment of inertia, measured about wheel axis. |

At 502, servo specifications are defined and include a desired response to a roll angle step input which acts as a reference. A control objective is to stabilize the motorcycle and to allow the motorcycle to track a reference roll angle trajectory for a range of forward velocities. Optionally, tracking of the reference roll angle may be for a single forward velocity. Following are exemplary servo specifications provided for illustrative purposes and not intended to be limiting in any form or manner.

Rise Time $\subset$ [0.3, 0.5] seconds

Overshoot$\leq$20%

Settling Time$\leq$5 seconds

Sensitivity specifications:

$|S|=|1/(1+L)|\leq 8$ db

Where: $L=G_1 \cdot$(Inner Closed Loop)$\cdot P_1$, namely:

$$L = G_1 \left( \frac{G_2 P_2}{1 + G_2 P_2} \right) P_1$$

Figure 7:
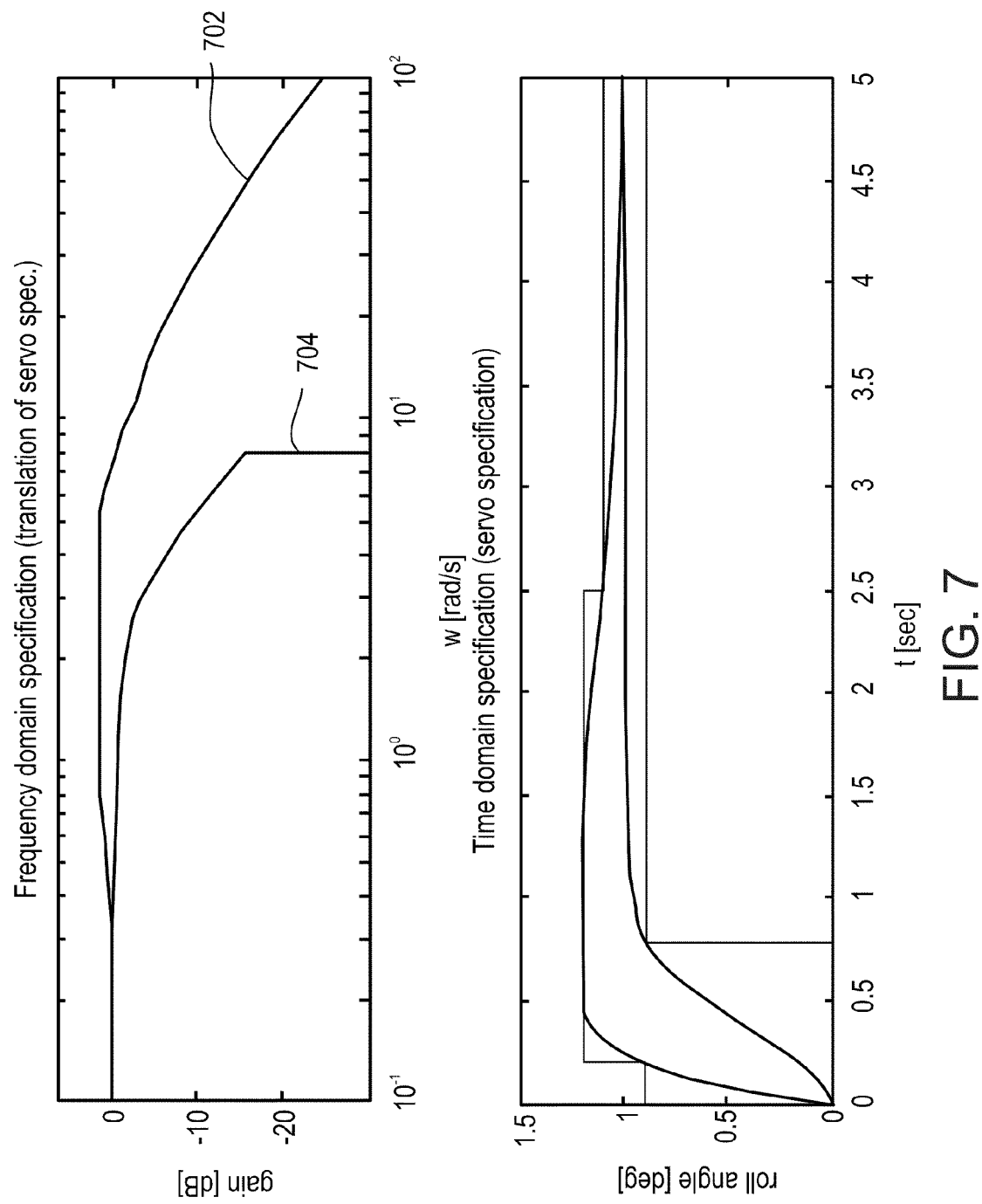
FIG. 7 schematically illustrates a frequency domain plot and a time domain plot for an exemplary servo specification used in the method of FIG. 5, in accordance with an embodiment of the present invention.

At 503, the servo specifications are converted from time domain to frequency domain since in QFT controller synthesis is done in the frequency domain. In order to make the conversion, it is assumed that the resulting closed loop is a transfer function of order 3. The original time-domain specification and their frequency-domain equivalent are shown in FIG. 7. In the figure, curve 704 and curve 702 are lower and upper bounds for the closed loop in the frequency domain, respectively, which result from translating the servo specification originally given in the time domain. Since the real closed loop is a transfer function of order higher than 3, a cut-off is applied to curve 704, to allow for a roll off at the higher frequencies that is steeper than 60 dB/dec. A cut-off frequency was set to be 8 rad/sec, which is an approximate location of the desired closed loop bandwidth.

Figure 8:
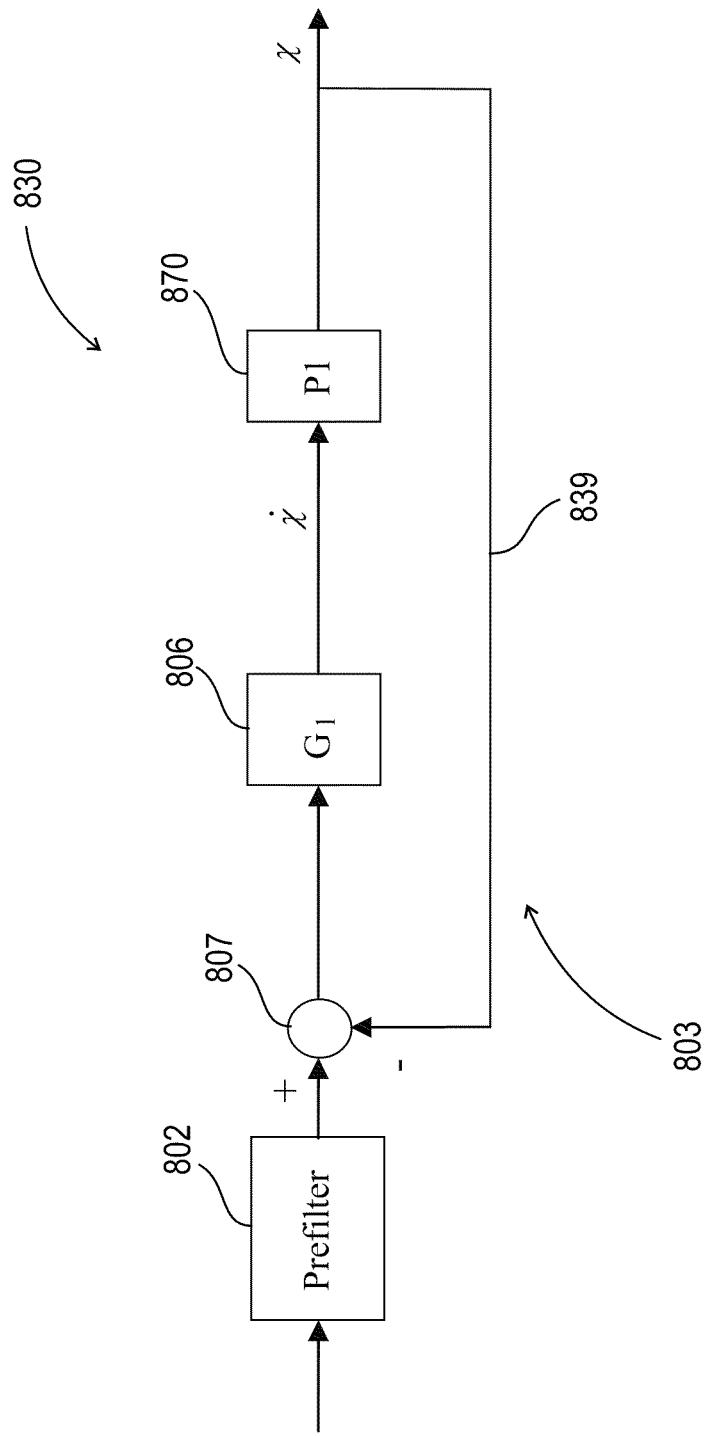
FIG. 8 schematically illustrates an exemplary robust controller with a unity closed inner loop used in the method of FIG. 5; in accordance with an embodiment of the present invention.

At 504, compensator G1 606 for outer loop 603 is designed. Optionally, the QFT design is "outside-in", i.e. compensator G1 606 for outer loop 603 may be designed first, assuming that inner loop 601 given by transfer function $P_2G_2/(1+P_2G_2)$ is sufficiently well regulated so that it can temporarily be approximated as 1. FIG. 8 illustrates robust controller 830 in closed loop 803, including a Prefilter 802, a subtracter 807, a compensator G1 806, a plant P1 870, and a feedback loop 839. Controller 830, including Prefilter 802, subtracter 807, compensator G1 806, plant P1 870, and feedback loop 839, are similar to that shown in FIG. 6 at 630, including 602, 607, 606, 670 and 639. Preliminary Horowitz-Sidi bounds in a Nichols Chart are computed for G1 806 based on the servo specifications. Based on the computed preliminary bounds adjust a compensating gain of G1 806 so that an open loop is within the preliminary bounds in the Nichols Chart. Optionally, a closed loop 803 bandwidth is kept as low as possible to reduce an effect of noise on the closed loop. Optionally, an effect of DC voltage saturation is considered.

At 505, determine the Horowitz-Sidi bounds for inner loop 601 in robust controller 630 based on the servo specifications and plot P2 617 on the Nichols Chart. The transfer function for P2 617 is given by $$\frac{\dot{\chi}(s)}{V_{in}(s)} = -\left[ \frac{(k_t/R) \cdot N \cdot s \cdot p_s(s)}{(\tau_e s + 1)(J_m N^2 s^2 p_1(s) + p_5(s)) + (k_t k_b/R) N^2 \cdot s \cdot p_1(s)} \right]$$

where $\tau_e = \frac{L}{R}$.

Optionally, gain and phase adjustments are made to satisfy P2 617 being within the inner loop bounds.

At 506, compensator G2 610 for inner loop 601 is designed by trial and error. Inner loop 601 is preferably maintained within the Horowitz bounds in the Nichols Chart.

At 507, outer loop 603 bounds are computed in the Nichols Chart to verify that actual outer loop 639 meets the servo specifications.

At 508, Prefilter 602 is designed. Prefilter 602 shapes the transfer function from reference roll angle to output (actual) roll angle and determines an overall bandwidth of controller 630. A Bode plot of the closed loop may be used to determine a type of Prefilter 602 which will ensure the closed loop lies within design limits.

At 509, design of compensators G1 606 and G2 610, and Prefilter 602, has been done in continuous time domain. For digital implementation, G1 606 and G2 610, and Prefilter 602, are converted into discrete-time form. Once translated, the discrete-time compensators and Prefilter are verified, optionally on the Nichols Chart, as meeting required specifications. Translation from continuous time domain to discrete-time domain may be optionally done by using zero-pole matching techniques.

At 510, a final step of the method is to perform simulations both in the frequency and time domains to verify that the closed loop indeed meets the servo specifications (bearing in mind that the closed loop was approximated as a $3^{rd}$ order systems for the conversion of the closed loop servo specifications from time domain to frequency domain).

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following example of a synthesis of a robust controller based on the method shown in FIGS. 5-8, which together with the above descriptions; illustrate some embodiments of the invention in a non limiting fashion. The inventor constructed an experimental prototype of an unmanned single-track vehicle based on a 50 cc motorcycle. An experimental goal was for the motorcycle to travel at velocities ranging from 2.5 to 6.5 msec while tracking a reference roll angle and maintaining stability (maintaining its balance). In a first stage, the stabilizing system was first synthesized and simulations were performed. The prototype was then subject to actual travelling tests. Synthesizing of the stabilizing system was done using QSYN—The Toolbox for Robust Control Systems Design for use with MATLAB. Optionally, other numerical computing systems and/or methods may be used.

The prototype motorcycle has a variable transmission, which enables travel at various speeds without shifting of gears, thus eliminating a need for clutch and gear-shifting actuators. Variable transmission may be smoother than with manual transmission. The process of gear shifting in a manual transmission is jerky, and would have added considerable disturbances to the system. This consideration, together with compact dimensions and lower weight, has led to the choice of the scooter as the platform for the synthesis.

In order to build an accurate dynamic model of the motorcycle, physical measurements were taken and a CAD (Computer Aided Design) model was devised. The motorcycle was disassembled into its rear and front assembly. Each assembly was weighed, the dimensions of its various components were measured and its center of gravity location was determined experimentally. This data was used to build a CAD model of the motorcycle. The CAD model served to find the inertia tensors of the front and rear subassemblies A. Plant Parameters Plant P1 is an integrator.

Plant $P_2$ includes the DC motor and the dynamics of the motorcycle. Some of its parameters are assumed to be known exactly (Table 1 and Table 2) while the other are defined as uncertain ranges (Table 3).

TABLE 1

Steering DC Motor Parameters.

| Parameter | Description | Value |
|---|---|---|
| $k_t$ | Torque constant | $0.0847 \left[ \frac{Nm}{A} \right]$ |
| $k_b$ | Back EMF constant | $0.0847 \left[ \frac{V}{rad/sec} \right]$ |
| $J_m$ | Armature inertia | 102.3 [Kg · mm$^2$] |
| R | Armature resistance | 4.887 [Ω] |

TABLE 1-continued

Steering DC Motor Parameters.

| Parameter | Description | Value |
|---|---|---|
| L | Armature inductance | 2.18 [mH] |
| N | Transmission reduction (motor gear head and timing pulleys combined) | 45 |

TABLE 2

Motorcycle parameters defined without uncertainty.

| Parameter | Description | Value |
|---|---|---|
| λ | Steering head angle | 27° |
| $c_f$ | Mechanical trail | 86.53 [mm] |
| d | See Appendix A | 4.5 [mm] |
| $c_w$ | Wheel base | 1.08 [m] |
| $r_r$ | Rear wheel radius | 0.205 [m] |
| $r_f$ | Front wheel radius | 0.205 [m] |
| $l_f$ | Forward distance of the front assembly center of mass relative to the front wheel contact point | −0.1073 [m] |
| $h_f$ | Height of the front assembly center of mass relative to the front wheel contact point | 0.4110 [m] |
| $Iyz_r$ | y-z product of inertia of rear assembly, measured about rear center of mass. | 0.2204 [kg · m²] |
| $Iyz_f$ | y-z product of inertia of front assembly, measured about front center of mass. | −0.012 [kg · m²] |
| $Ixx_2$ | Rear wheel moment of inertia, measured about wheel axis. | 0.0431 [kg · m²] |

Plant P2 uncertainty is due to uncertainty in some of the physical parameters and to the fact that the control system is required to operate over a range of forward velocity (Table 3).

TABLE 3

Motorcycle parameters defined with uncertainty.

| Parameter | Description | Nominal Value | Uncertainty range |
|---|---|---|---|
| V | Forward velocity | $2.5 \left[\frac{m}{s}\right]$ | $2.5 - 6.5 \left[\frac{m}{s}\right]$ |
| $l_r$ | Forward distance of the rear assembly center of mass relative to the rear wheel contact point | 0.4 [m] | ±15% |
| $h_r$ | Height of the rear assembly center of mass relative to the rear wheel contact point | 0.4096 [m] | ±15% |
| $m_r$ | Mass of rear assembly | 105.3572 [kg] | ±15% |
| $m_f$ | Mass of front assembly | 13.9242 [kg] | ±5% |
| $Iyy_r$ | y-y moment of inertia of the rear assembly, measured about rear center of mass | 4.7235 [kg · m²] | ±15% |
| $Izz_r$ | z-z moment of inertia of the rear assembly, measured about rear assembly center of mass | 11.2341 [kg · m²] | ±15% |
| $Iyy_f$ | y-y moment of inertia of the front assembly, measured about front center of mass | 1.1467 [kg · m²] | ±15% |
| $Izz_f$ | z-z moment of inertia of the front assembly, measured about front assembly center of mass | 0.0530 [kg · m²] | ±15% |
| $Ixx_1$ | Front wheel moment of inertia, measured about wheel axis. | 0.0431 [kg · m²] | ±15% |

B. Design Specifications

The control objective is to stabilize the motorcycle and to allow the motorcycle to track a reference roll angle trajectory for a range of forward velocities.

Servo specifications (desired response to roll angle step input):
Rise Time ⊂ [0.3, 0.5] seconds
Overshoot≤20%
Settling Time≤5 seconds
Sensitivity specifications:
|S|=|1/(1+L)|≤8 db
Where: L=$G_1$·(Inner Closed Loop)·$P_1$, namely:

$$L = G_1 \left( \frac{G_2 P_2}{1 + G_2 P_2} \right) P_1$$

Since in QFT controller synthesis is done in the frequency domain, the servo specifications that are given in the time domain are translated into frequency domain equivalents. In order to make the translation, it is assumed that the resulting closed loop is a transfer function of order 3. The original time-domain specification and their frequency-domain equivalent are shown in 7. In FIGS. 7, 704 and 702 are the lower and upper bounds for the closed loop in the frequency domain, respectively, which result from translating the servo specification originally given in the time domain. The real closed loop is a transfer function of order higher than 3, so a cut-off may be applied to 704, to allow for a roll off at the higher frequencies that is steeper than 60 dB/dec. The cut-off frequency was set to be 8 rad/sec, which is an approximate location of the desired closed loop bandwidth.

C. Design Procedure

Before considering the control problem itself, an important limitation, which results from an inexpensive hardware used in this project, must be noted. The microcontroller issues a new output command to the steering motor driver every 20 msec. Due to a relatively low resolution of the sensors readings, as much of this time period as possible may be needed for sampling the sensors repeatedly and averaging them. We may then want to allocate as little time as possible for the floating-point computations of the control algorithm, since such calculations require a lot of time on the fixed-point type microcontroller used. Since higher order compensators may require longer floating point computations, synthesizing of the controllers may be made as simple (i.e. of low order) as possible.

Figure 9A:
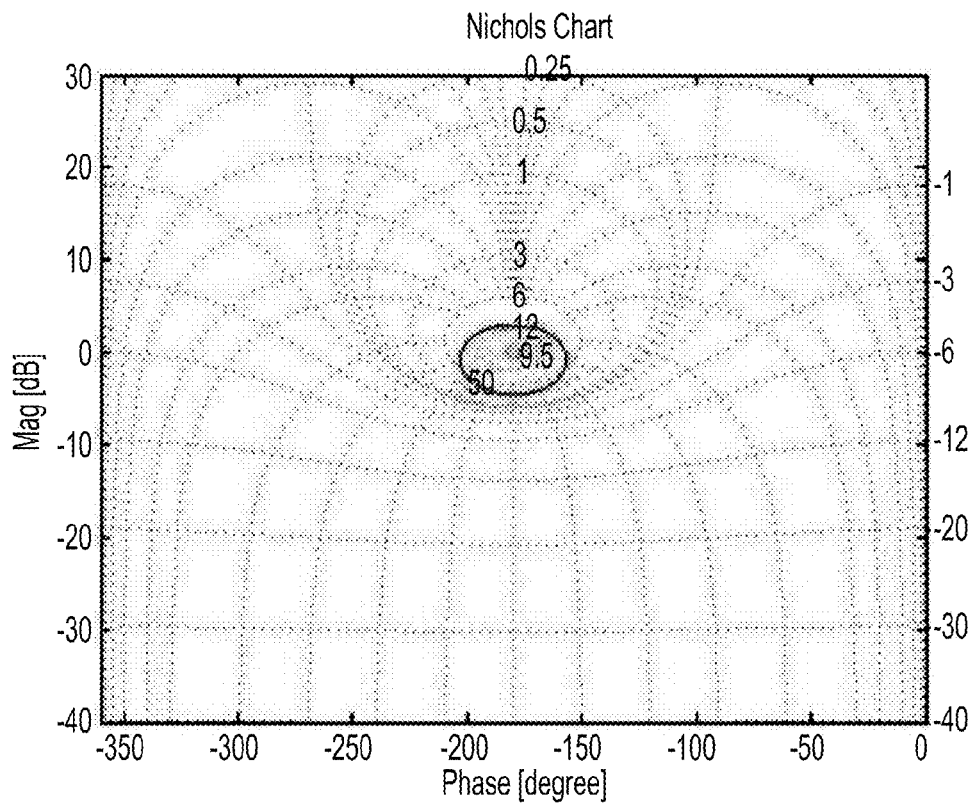
FIG. 9A schematically illustrates a Nichols Chart plot with preliminary bounds for an outer loop in an example simulation of a robust controller, in accordance with an embodiment of the present invention.

Contrary to conventional design, the QFT design may be done "outside-in", i.e. the compensator for the outer loop may be designed first, assuming that the inner closed loop, $P_2 G_2/(1+P_2 G_2)$, may be well regulated so that it can temporarily be approximated as 1. The loop is approximated, temporarily, as previously shown in FIG. 8. The feedback controller $G_1$ may now be designed to satisfy the above specifications. The Horowitz-Sidi bounds for $G_1$ are depicted in FIG. 9A.

From the servo specification (FIG. 7 and section B above), the bandwidth of the desired closed loop is about $$8 \frac{\text{rad}}{s}.$$

Figure 9B:
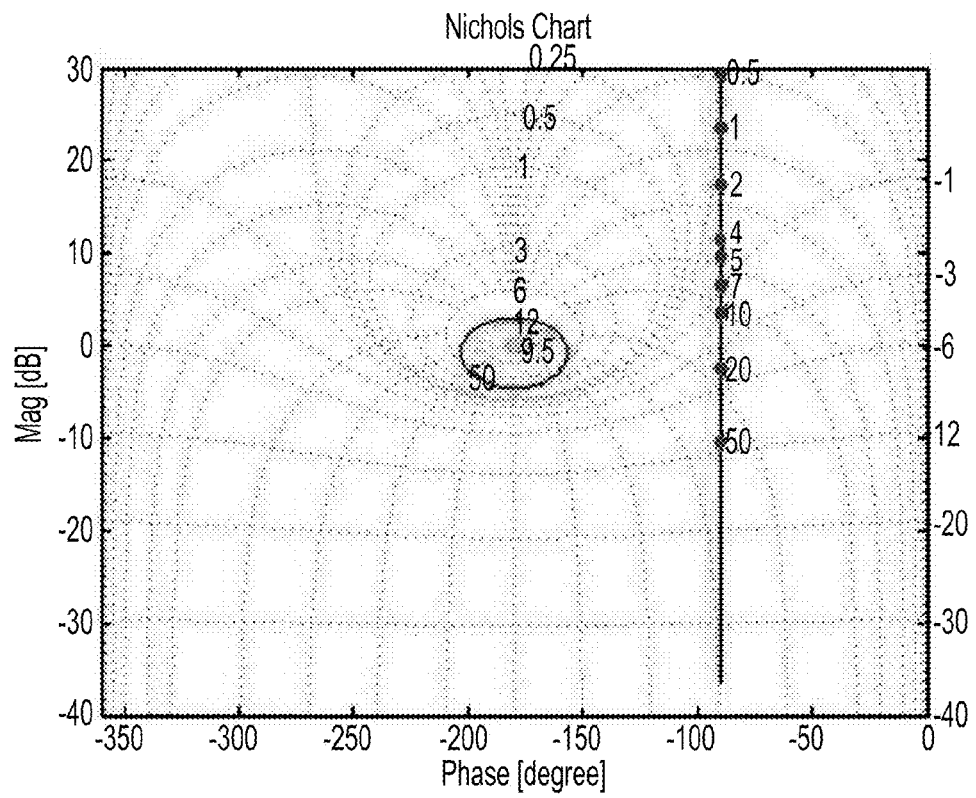
FIG. 9B schematically illustrates a Nichols Chart plot with compensated outer loop and sensitivity bounds in an example simulation of a robust controller, in accordance with an embodiment of the present invention.

A proportional gain compensator is may then be used to raise the open loop in the Nichols chart. We set $G_1$=15 (Giving a bit more gain that seems necessary, bearing in mind that at the end of the design procedure the actual inner closed loop will not be equal to 1). The result is depicted in FIG. 9B.

In synthesizing the compensator, the closed loop bandwidth is made as low as possible for two reasons. Firstly, to attempt to keep the effects of noise (usually at high frequencies) from affecting the loop. Secondly, as there may be a bound on the amount of voltage the batteries can supply, so that 100% PWM duty cycle equals 24 Volts saturation. $G_1$ may be synthesized so as to keep a fair amount of margins from the bounds as the inner closed loop was approximated as 1. Optionally, as synthesis is done in continuous time and are required in discrete time for implementation in a discrete time microcontroller.

Figure 9C:
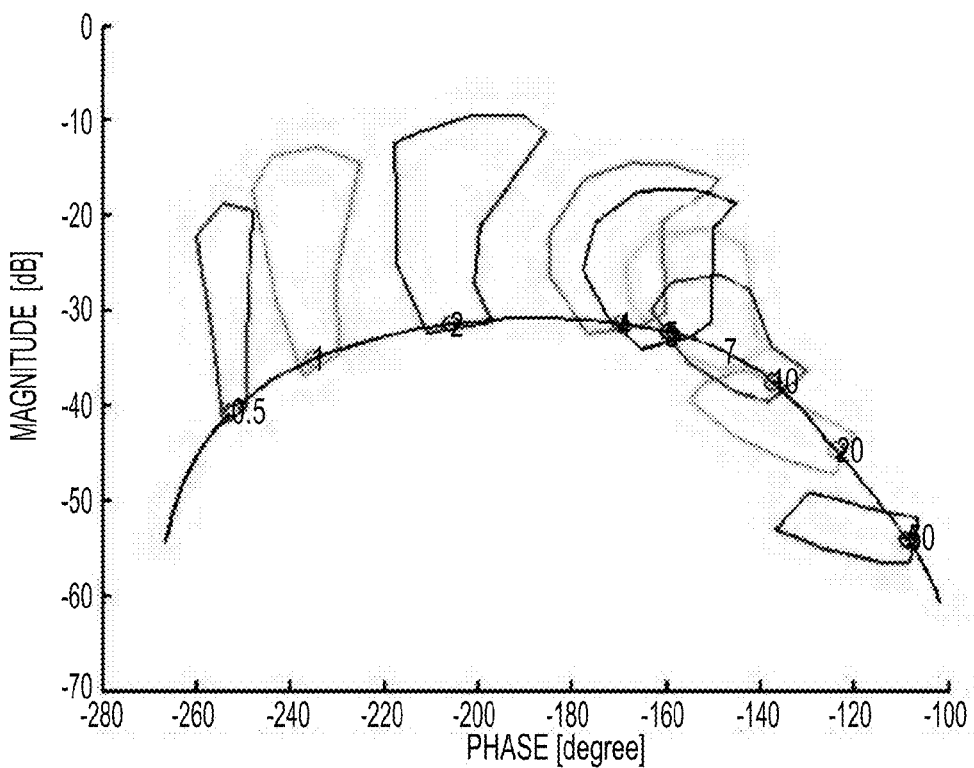
FIG. 9C schematically illustrates a Nichols Chart plot with inner loop templates in an example simulation of a robust controller, in accordance with an embodiment of the present invention.
Figure 9D:
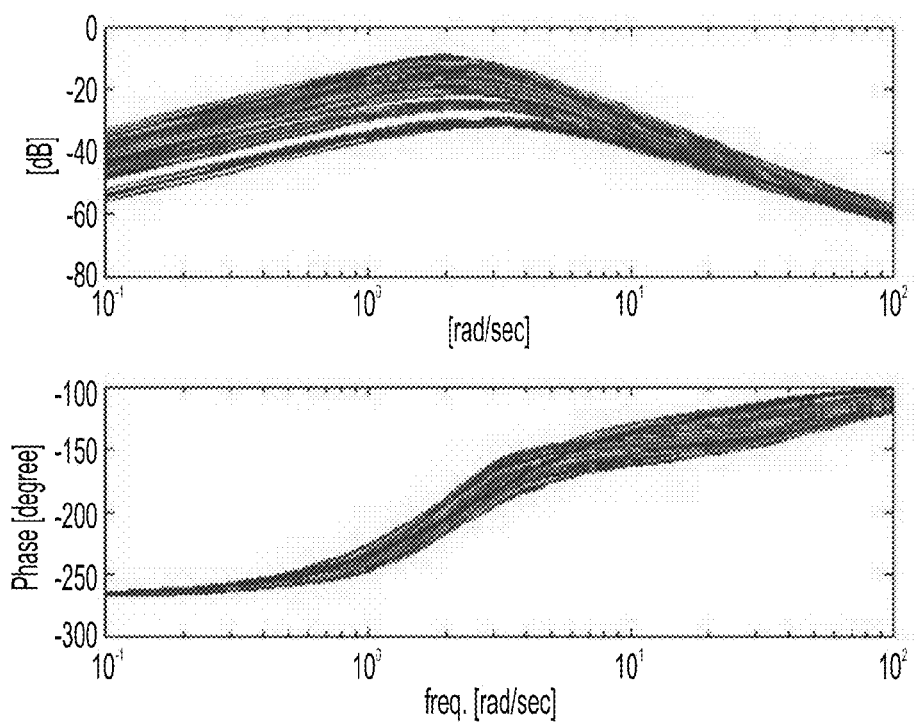
FIG. 9D schematically illustrates a Bode Diagram of a set of inner loop plants P2, in an example simulation of a robust controller, in accordance with an embodiment of the present invention.
Figure 9E:
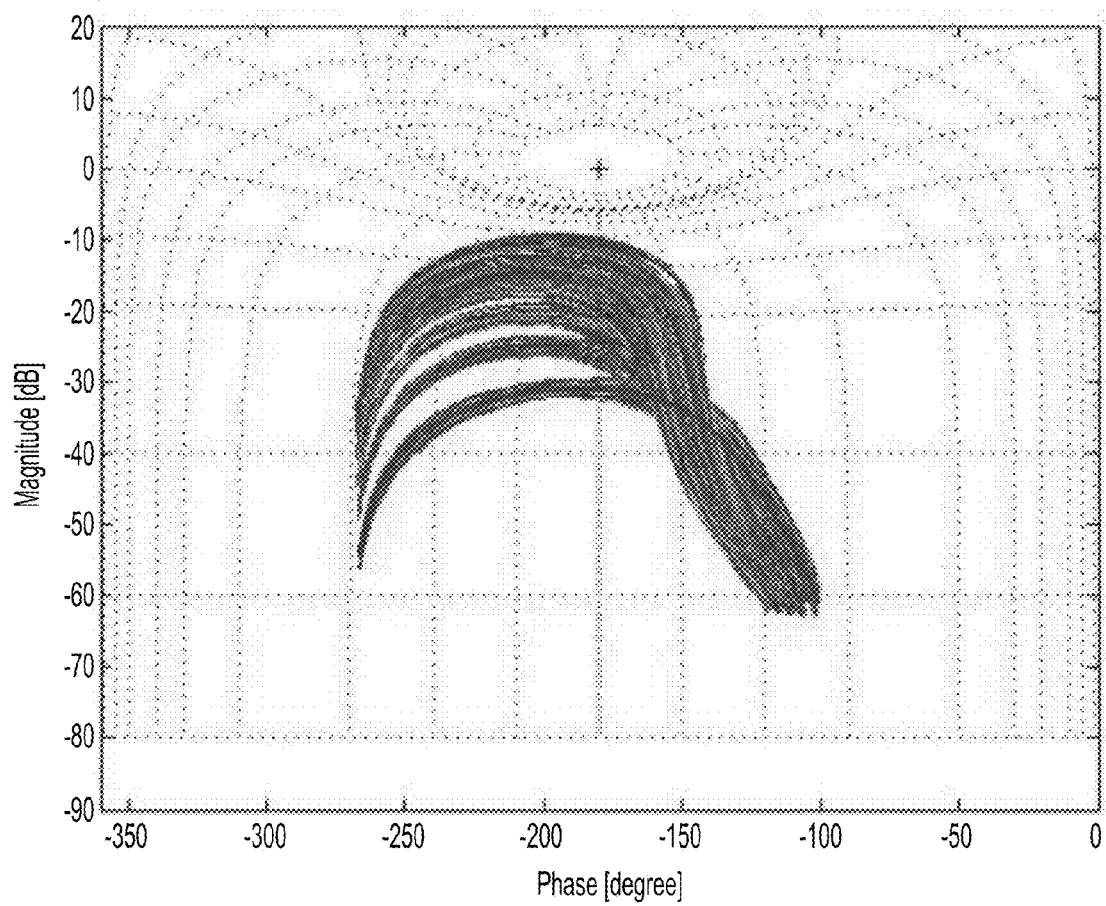
FIG. 9E schematically illustrates a Nichols Chart of a set of inner loop plants P2, in an example simulation of a robust controller, in accordance with an embodiment of the present invention.

FIG. 9C depicts the templates (value sets) of the inner plant $P_2$ in the Nichols chart. The templates represent the amount of uncertainty (gain and phase) at the specific frequencies. See also FIG. 9D and FIG. 9E for a Bode diagram and a Nichols chart of the set of inner loop plants.

Figure 10A:
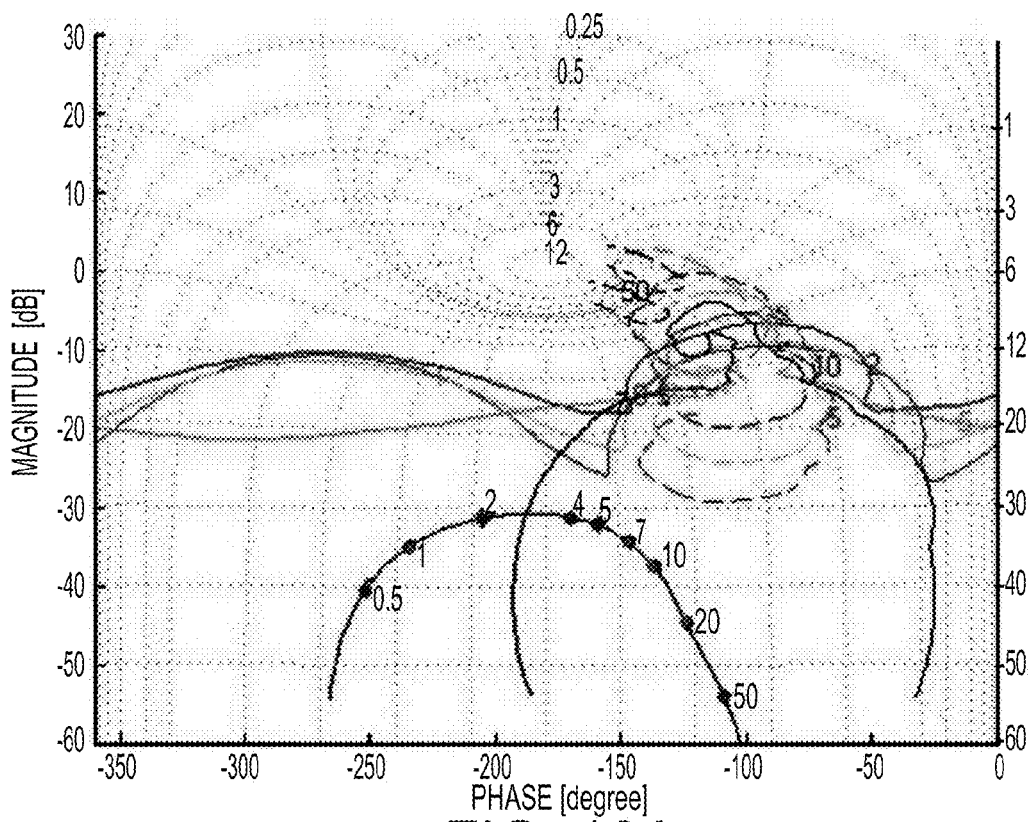
FIG. 10A schematically illustrates a Nichols Chart of a set of uncompensated inner loop and bounds, in an example simulation of a robust controller, in accordance with an embodiment of the present invention.
Figure 10B:
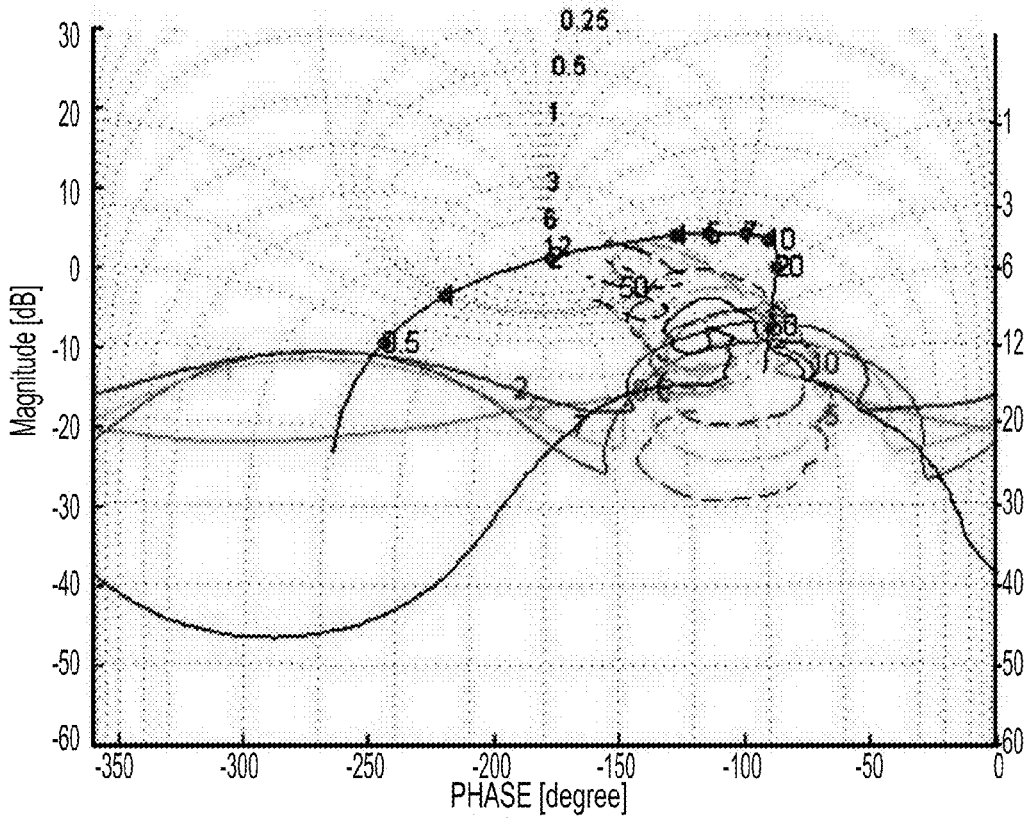
FIG. 10B schematically illustrates a Nichols Chart of a set of compensated inner loop and bounds, in an example simulation of a robust controller, in accordance with an embodiment of the present invention.

Now that $G_1$ is synthesized, Horowitz-Sidi bounds may be drawn for the inner loop. These bounds may be calculated using QSYN based on the specification from section B above. FIG. 10A depicts the nominal plant $P_2$ and the Horowitz-Sidi bounds. Additional gain and frequency lead of about 45° at the mid frequencies may be required to satisfy these bounds. The compensator $$G_2(s) = 35 \frac{\left(1 + \frac{s}{3}\right)}{\left(1 + \frac{s}{20}\right)}$$

may be derived by trial and error, with the resulting inner loop fulfilling the Horowitz bounds, as shown in FIG. 10B.

Figure 11A:
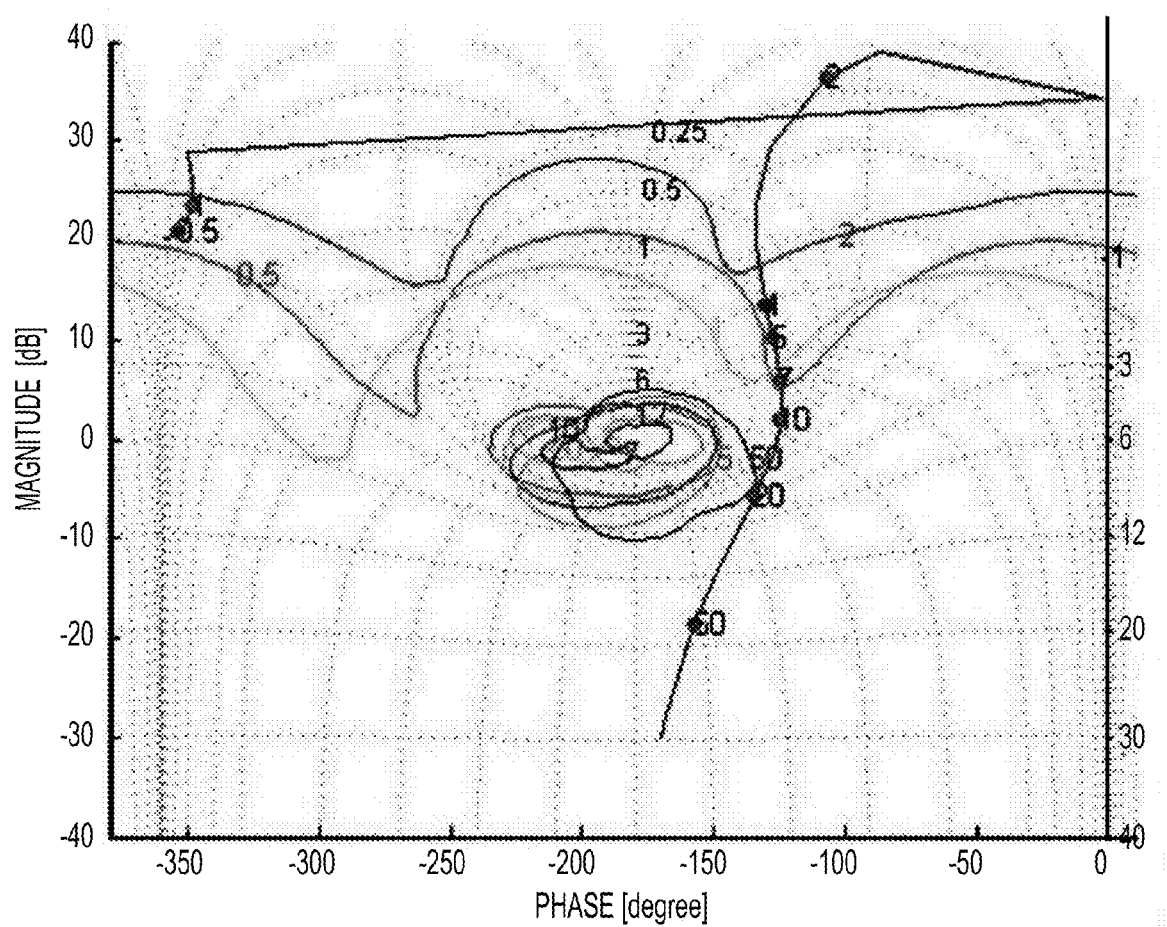
FIG. 11A schematically illustrates a Nichols Chart of a set of compensated outer loop and bounds, in an example simulation of a robust controller, in accordance with an embodiment of the present invention.

Now that $G_2(s)$ has been determined and the inner closed loop is known, the outer loop bounds may be computed once more in order to verify that actual outer loop indeed meets the specifications. FIG. 11A shows that this is the case.

Figure 11B:
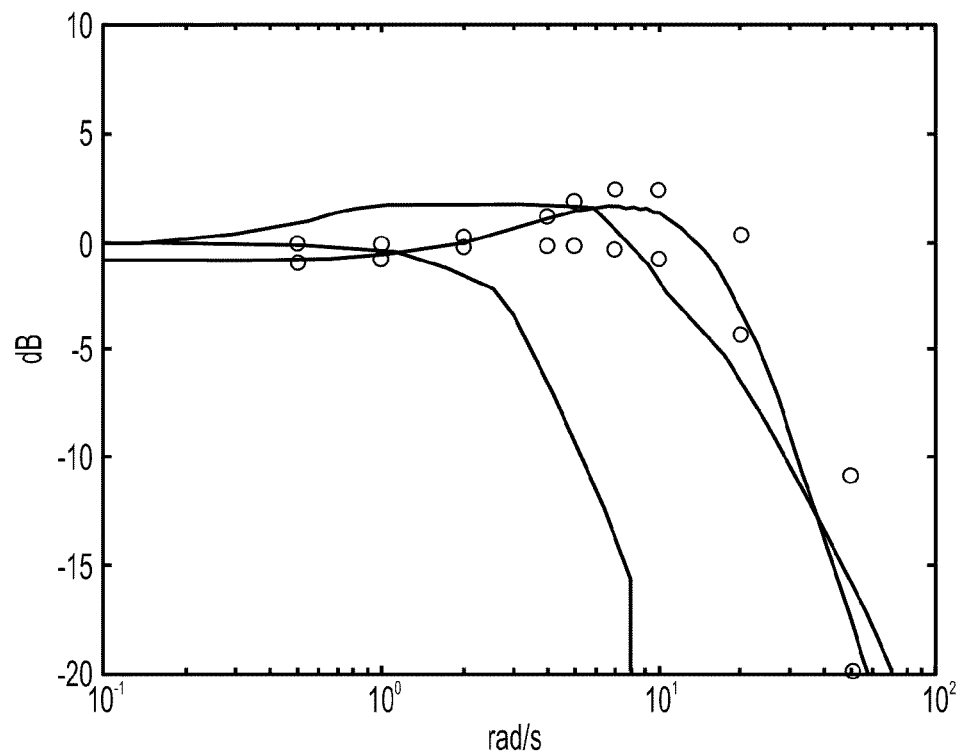
FIG. 11B schematically illustrates a plot of gain in a compensated closed loop transfer function without prefilter, in an example simulation of a robust controller, in accordance with an embodiment of the present invention.
Figure 11C:
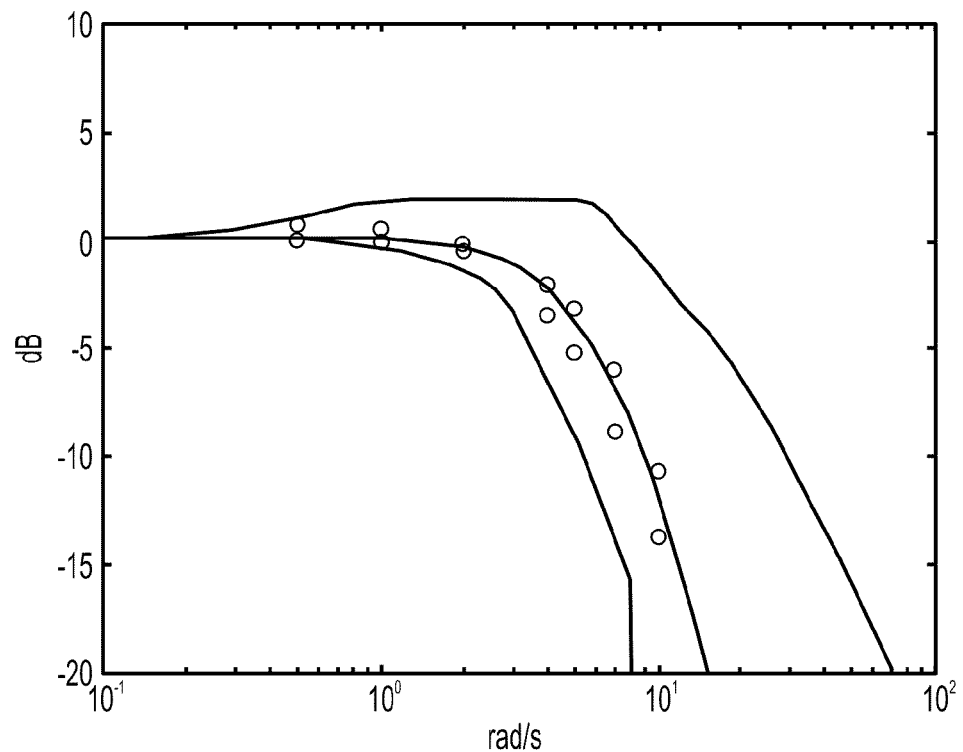
FIG. 11C schematically illustrates a plot of gain in a compensated closed loop transfer function with prefilter, in an example simulation of a robust controller, in accordance with an embodiment of the present invention.

QFT is two degrees of freedom (2 DOF) control synthesis method. The first DOF may be used to synthesize the closed loop compensators in order to reduce the closed loop uncertainty and optionally, to reject disturbances. The second DOF may be used to derive a prefilter F(s), which shapes the transfer function from reference to output (i.e. determines the bandwidth). Accordingly, now that the feedback compensators $G_1(s)$ and $G_2(s)$ have been derived, the prefilter F(s) may be designed. The Bode plot of the closed loop without a prefilter is shown at FIG. 11B. It can be seen that closing the loop has reduced the closed loop uncertainty to satisfy the limits. Yet, a prefilter F(s) composed of a small gain and a low pass may ensure that the closed loop lies within the design limits. Adding the prefilter $$F(s) = 1.1 \frac{1}{(s/5 + 1)^2}$$

yields the loop depicted in FIG. 11C.

D. Discrete-Time Controllers

Up to this point the design of the controllers and prefilter has been carried out in continuous time domain. For digital implementation, they may be translated into equivalent discrete-time form. Optionally, verification may be done of the discrete-time compensators fulfilling the design specifications. The outer loop compensator G1(s) is may need no conversion. The inner loop compensator $G_2(s)$ may be translated into discrete-time form using the matched zero-pole method resulting in:

$$G_2(z) = 198.1 \frac{(z - 0.94194)}{(z - 0.67030)}$$

The same procedure is applied to F(s), resulting in:

$$F(z) = \frac{0.009962}{(z^2 - 1.81z + 0.8187)}$$

Figure 12A:
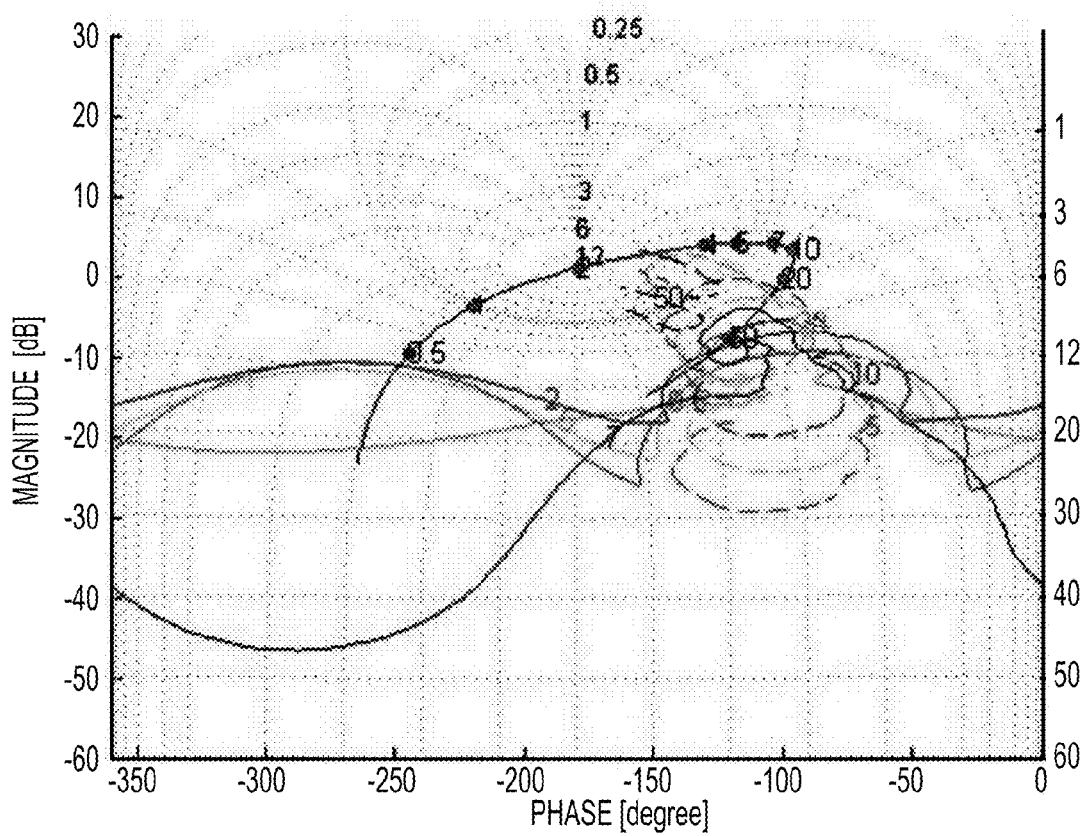
FIG. 12A schematically illustrates a Nichols Chart of a set of compensated inner loop and bounds with discrete time compensators, in an example simulation of a robust controller, in accordance with an embodiment of the present invention.
Figure 12B:
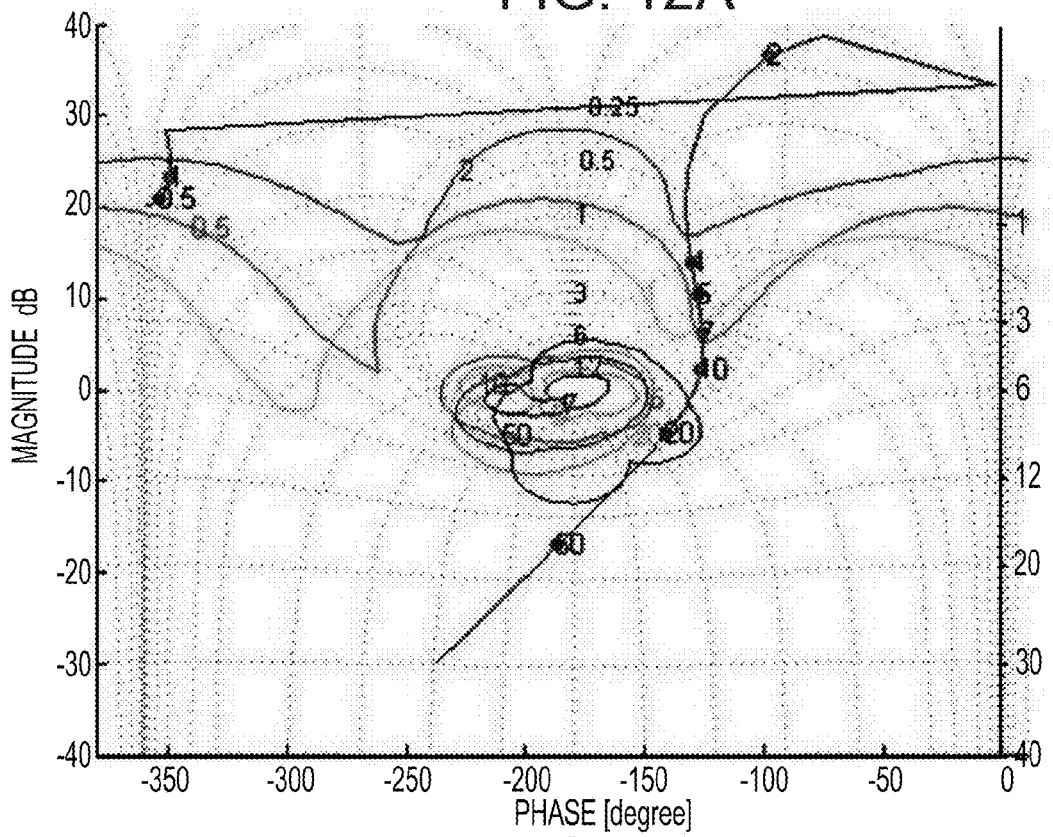
FIG. 12B schematically illustrates a Nichols Chart of a set of compensated outer loop and bounds with discrete time compensators, in an example simulation of a robust controller, in accordance with an embodiment of the present invention.

The inner and outer loops obtained with these compensators are shown in FIGS. 12A and 12B, respectively.

Figure 12C:
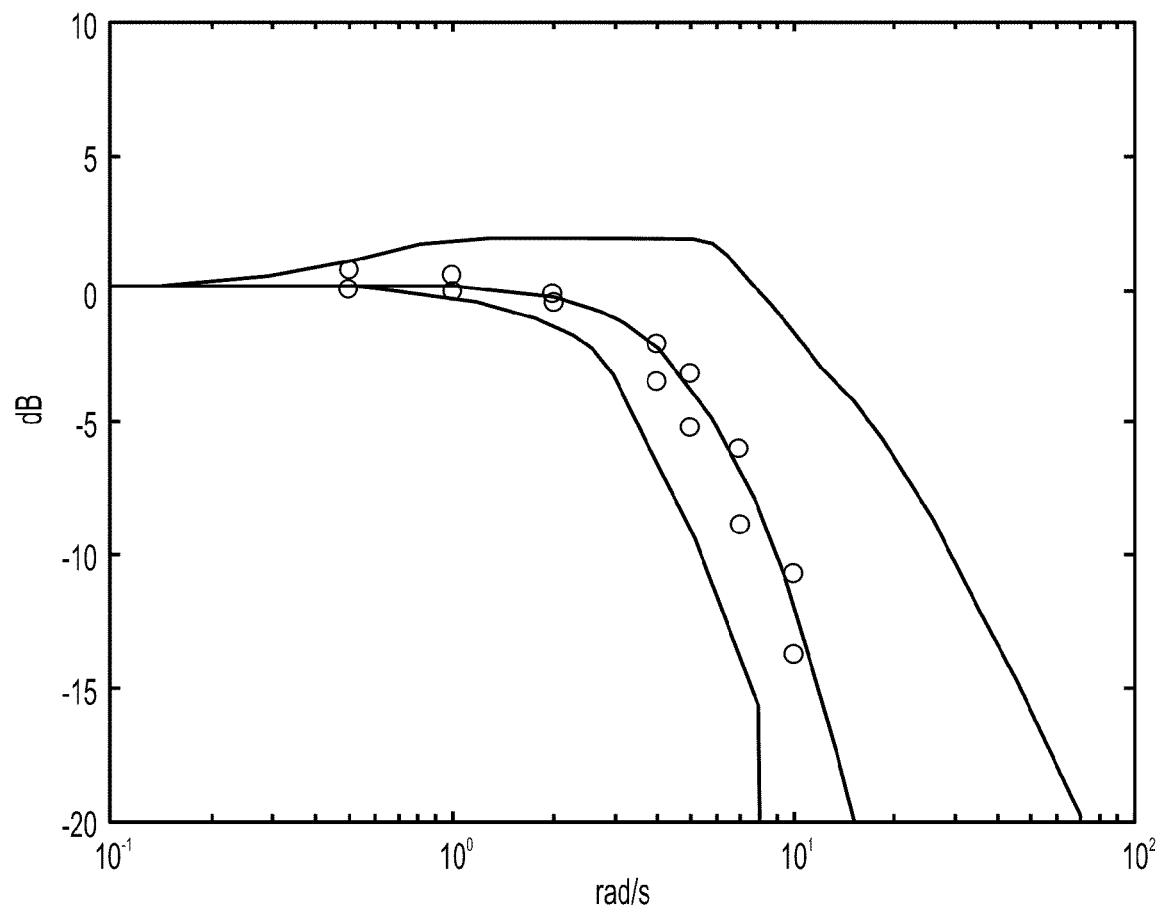
FIG. 12C schematically illustrates a plot of gain in a compensated closed loop with discrete time compensators and discrete time prefilter, in an example simulation of a robust controller, in accordance with an embodiment of the present invention.

From FIG. 12A and FIG. 12B it may be possible to see that both loops fulfill the Horowitz bounds, despite a roll-off caused by the discrete-time controllers introducing a time delay into the loop (due to the Sample and Hold operation). Finally, FIG. 12C shows that the discrete prefilter satisfactorily shapes the closed loop transfer function from the reference to the output.

E. Simulations

The final step of the control synthesis may be to perform simulations both in the frequency and time domains so as to verify that the closed loop meets the specifications (bearing in mind that the closed loop was approximated as a $3^{rd}$ order systems for the conversion of the closed loop servo specifications from time domain to frequency domain).

Figure 13A:
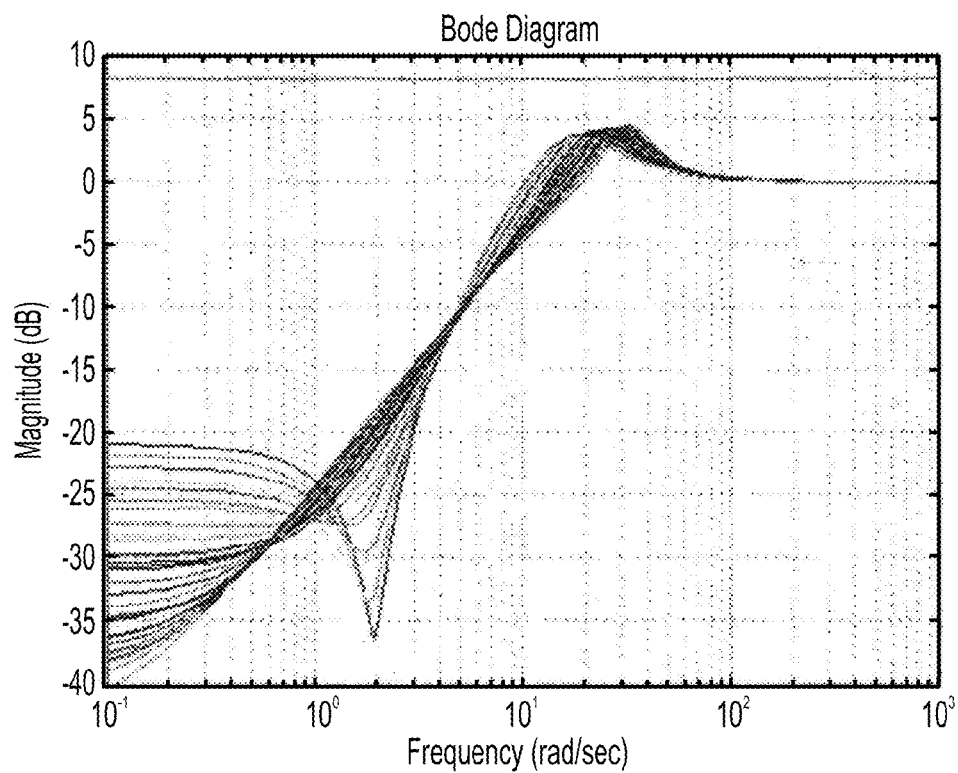
FIG. 13A schematically illustrates sensitivity gain of the outer loop, in an example simulation of a robust controller, in accordance with an embodiment of the present invention.

Sensitivity Specification: FIG. 13A shows the 8 db sensitivity bound, and closed loops of the set of plants. It may be seen that the closed loop fulfills the 8 db sensitivity specification at all frequencies.

Figure 13B:
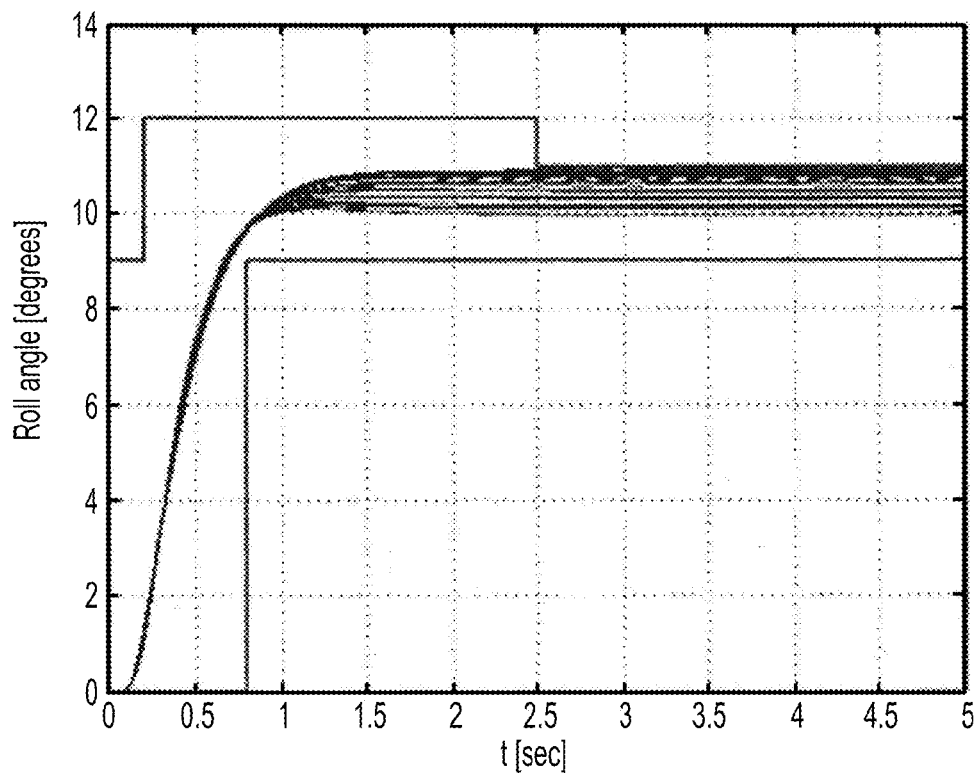
FIG. 13B schematically illustrates simulated step response for a set of closed loop, in an example simulation of a robust controller, in accordance with an embodiment of the present invention.

Servo Specification: FIGS. 13B-13F depict time response simulations, performed in MATLAB's Simulink, using the linear equations of motion for the motorcycle. FIG. 13B shows the response of the compensated closed loop to a reference step, and it can be seen that the closed loop fulfills the servo specifications for all the parameter combinations tested. $G_1(s)$ does not contain a pure integratorand, as a result, a steady state error is present and the actual value of the steady state error depends mainly on the forward velocity. An integrator in $G_1(s)$ may solve this at an expense of added complication. Since we are mostly interested in the dynamic (transient) behavior of the system and, it is important to keep the compensators as simple as possible, this result was deemed satisfactory. (One must keep in mind that the user, or in the future a GPS or image tracking procedure, closes yet another loop on the roll angle, in that he/she consistently alters the roll angle reference command in order to keep the motorcycle moving in the desired direction).

Figure 13C:
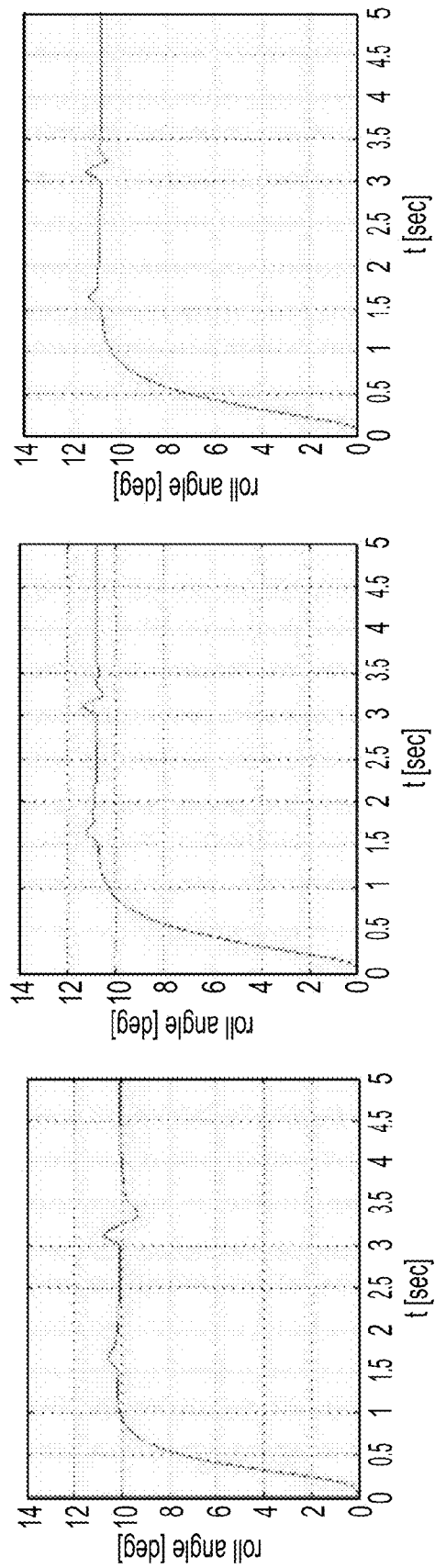
FIG. 13C schematically illustrates simulated roll angle responses of the closed loop to a reference step and disturbances for three forward velocities, in an example simulation of a robust controller, in accordance with an embodiment of the present invention.
Figure 13D:
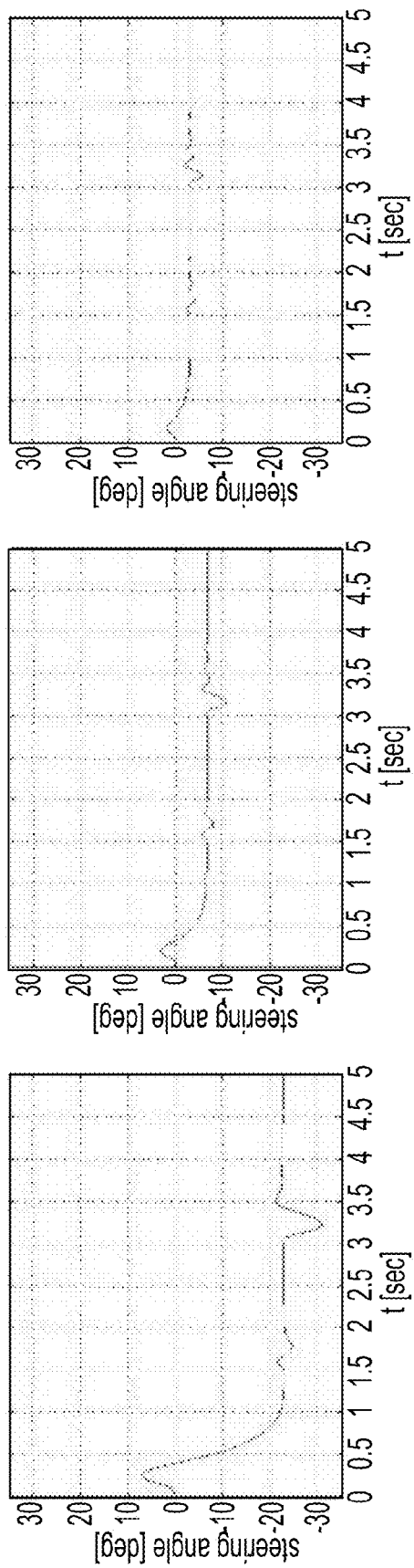
FIG. 13D schematically illustrates simulated steering angle responses of the closed loop to a reference step and disturbances for three forward velocities, in an example simulation of a robust controller, in accordance with an embodiment of the present invention.
Figure 13E:
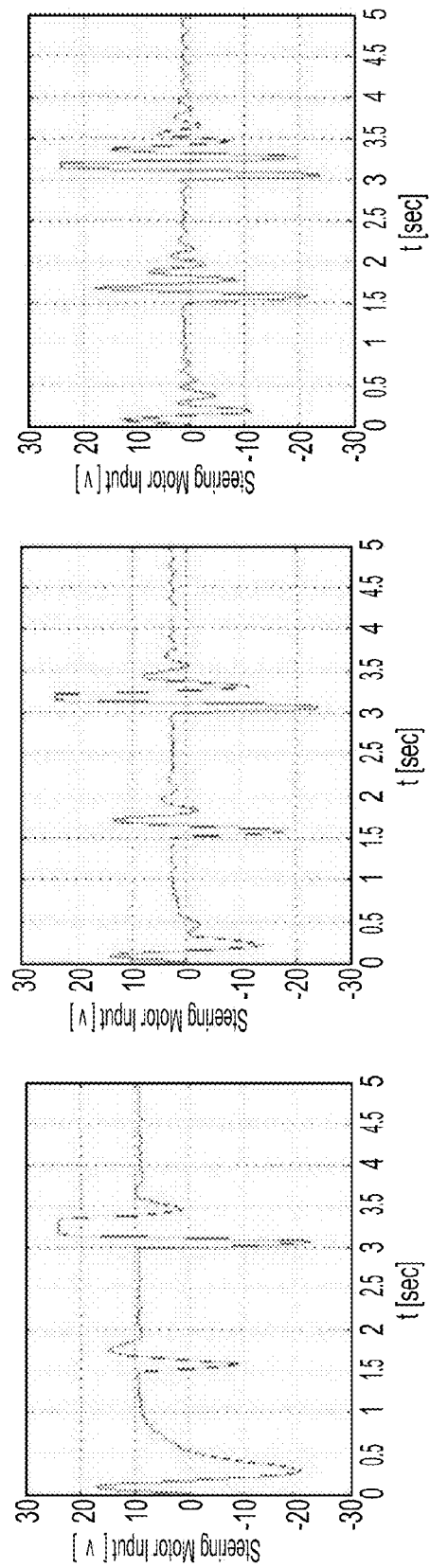
FIG. 13E schematically illustrates simulated voltage responses of the closed loop to a reference step and disturbances for three forward velocities, in an example simulation of a robust controller, in accordance with an embodiment of the present invention.
Figure 13F:
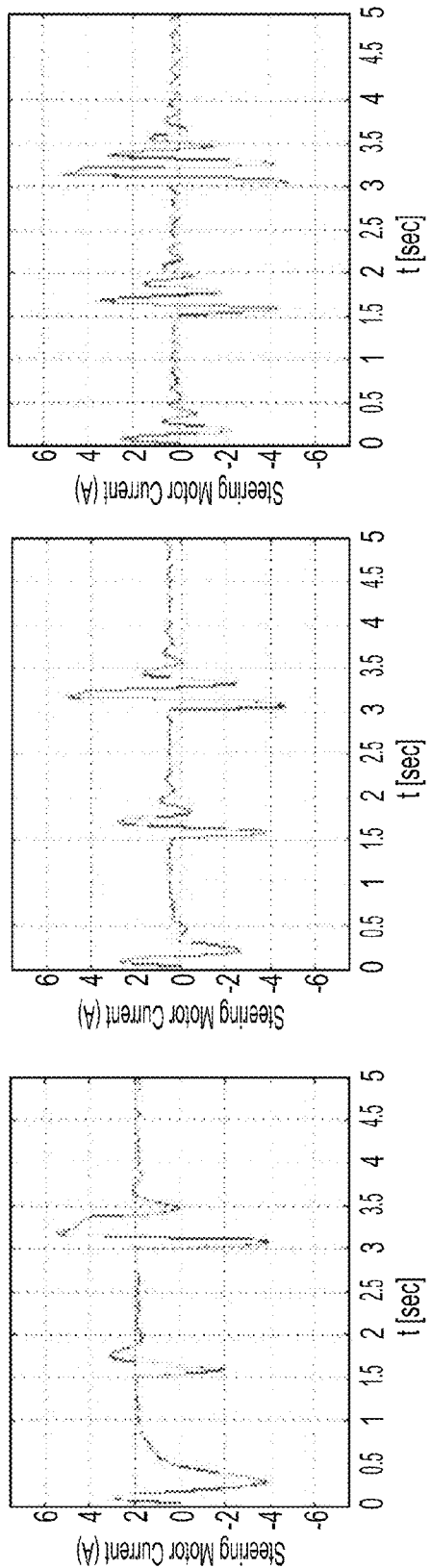
FIG. 13F schematically illustrates simulated steering motor current responses of the closed loop to a reference step and disturbances for three forward velocities, in an example simulation of a robust controller, in accordance with an embodiment of the present invention.

FIGS. 13C-13F show the ability of the control system to reject disturbances FIG. 13C shows the roll angle in degrees on the vertical axis in a range from 0-14 degrees and time in sec on the horizontal axis in a range from 0-5 sec, FIG. 13D shows the roll angle in degrees on the vertical axis in a range from 0-30 degrees and time in sec on the horizontal axis in a range from 0-5 sec, FIG. 13E shows the steering motor input voltage in volts on the vertical axis in a range from 0-30 volts and time in sec on the horizontal axis in a range from 0-5 seconds, and FIG. 13F shows the steering motor input current in amps on the vertical axis in a range from 0-8 amps and time in sec on the horizontal axis in a range from 0-5 seconds. They depict the roll angle, steering angle, motor voltage and motor current for a step reference signal (at t=0, amplitude=10 degrees), with a sudden steering torque disturbance of magnitude 10 [Nm] and of duration 0.1 [second] taking place at t=2.5 second, and a sudden roll torque disturbance of magnitude 75 [Nm] and of duration 0.1 [second] taking place at t=3.5 [second] (such a disturbance corresponds to someone shoving the motorcycle sideways, trying to trip it down, or to a sudden side-wind gust). We shall examine the effect of these disturbances for three forward velocity cases: 2.5 [m/s], 4.5 [m/s] and 6.5 [m/s].

From FIG. 13C it may be appreciated that the compensators are robust enough to stabilize the motorcycle and reject disturbances over the velocity range investigated. The motorcycle remains stable despite the strong steering and roll moments disturbances, and tracks the reference command (albeit a small steady state error). The voltage values remain below the saturation limits (FIG. 13E), except for the case of a very strong sideways shove, for which saturation briefly occurs. However, it can be seen that this does not affect the loop stability, in the simulated case.

In addition, two phenomena associated with motorcycles may be appreciated: a "Counter Steering" phenomenon to turn right, the initial direction of the steering being left (FIG. 13D); and, the higher the velocity, the smaller the steady state steering angle for a given steady state roll angle (FIG. 13C). This means that at higher speed, for a given roll angle, the motorcycle performs a wider turn (radius of curvature is larger). Another way to look at it is that for a given turn, the higher the velocity, the larger the roll angle (the motorcycle leans more steeply).

F. Experimental Results

The prototype, the unmanned motorcycle, was tested on flat asphalt surface and the results can be best appreciated by viewing the video clips posted at www.technion.ac.il/~linkerr/unmanned_motorcycle. Some of these tests included shoving the motorcycle sideways while it was traveling at very low speed, or jumping over a 10 cm-height ramp. During all these tests the motorcycle remained stable.

Figure 14A:
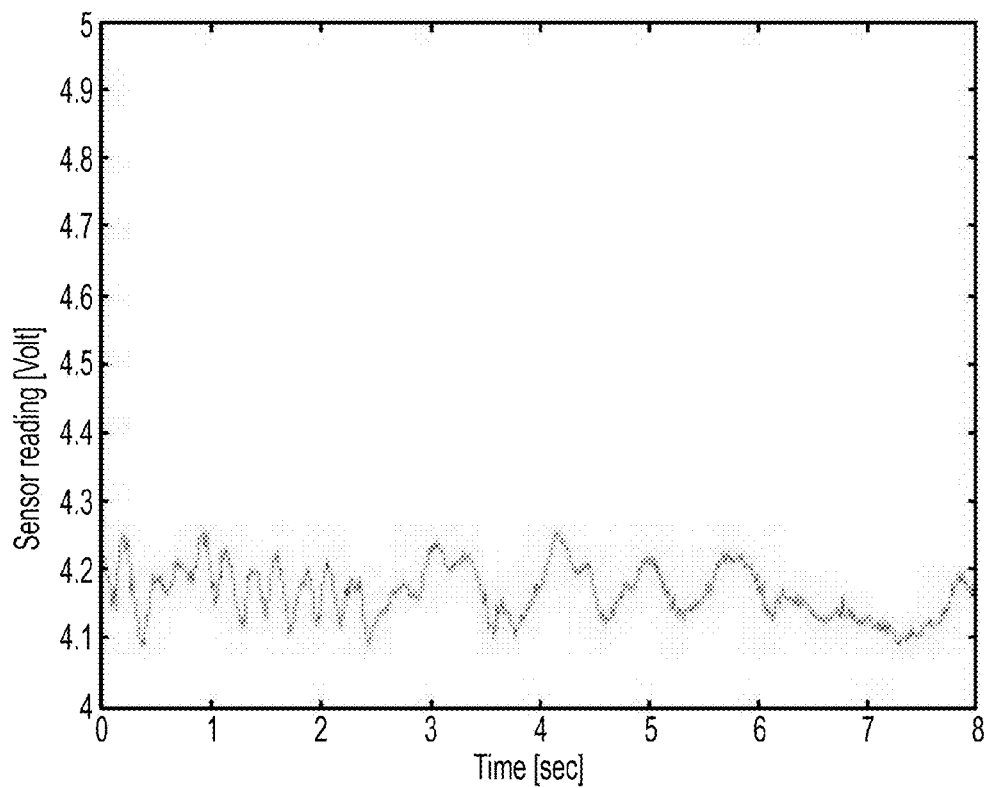
FIG. 14A schematically illustrates experimental results for a robust controller in an unmanned motorcycle with a joystick in an end-of-course position, in accordance with an embodiment of the present invention.
Figure 14B:
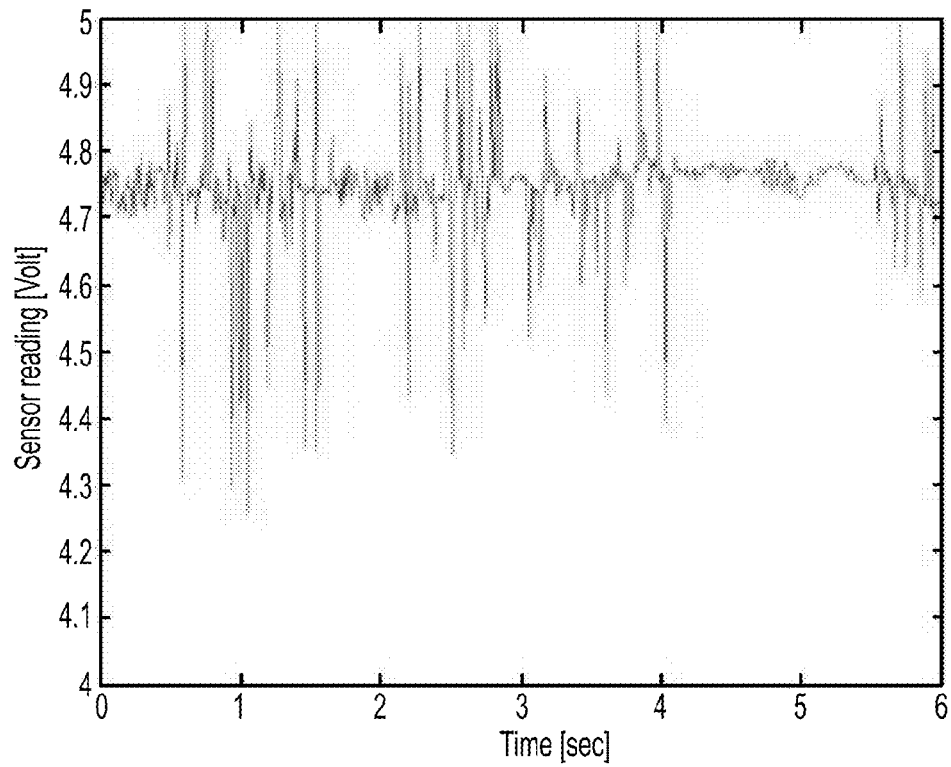
FIG. 14B schematically illustrates experimental results for a robust controller in an unmanned motorcycle with a joystick in neutral position, in accordance with an embodiment of the present invention.
Figure 14C:
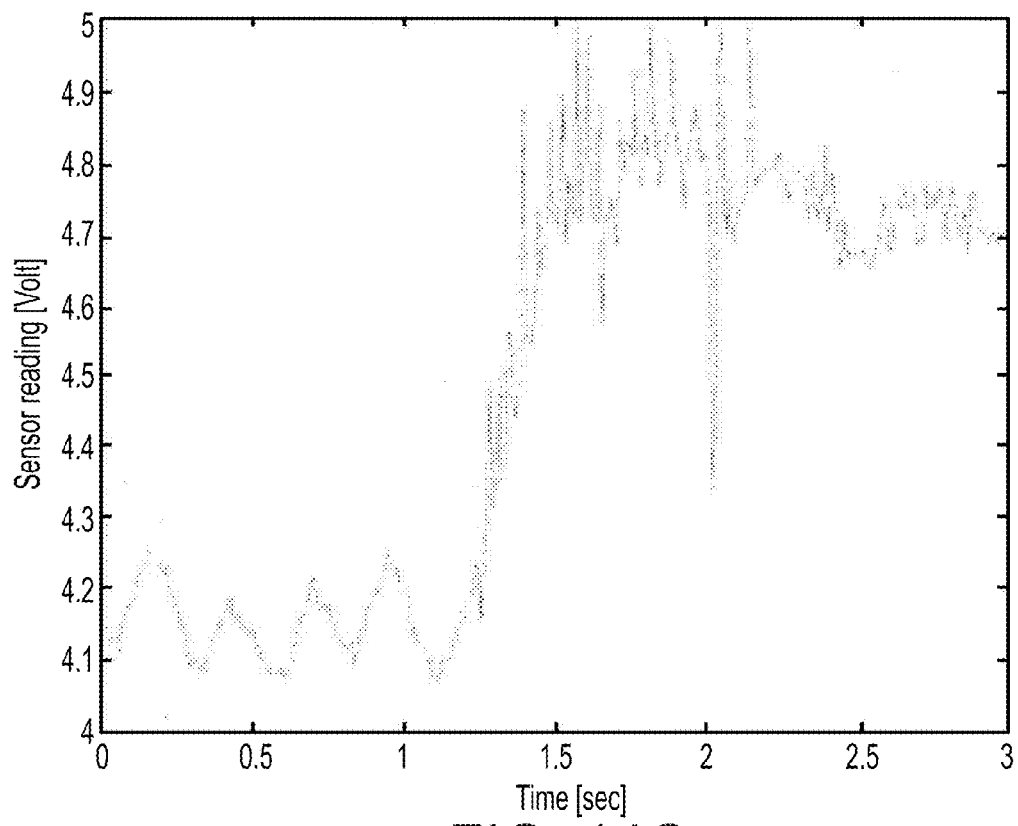
FIG. 14C schematically illustrates experimental results for a robust controller—with a positive step reference introduced approximately at t=1.1 sec, in accordance with an embodiment of the present invention.
Figure 14D:
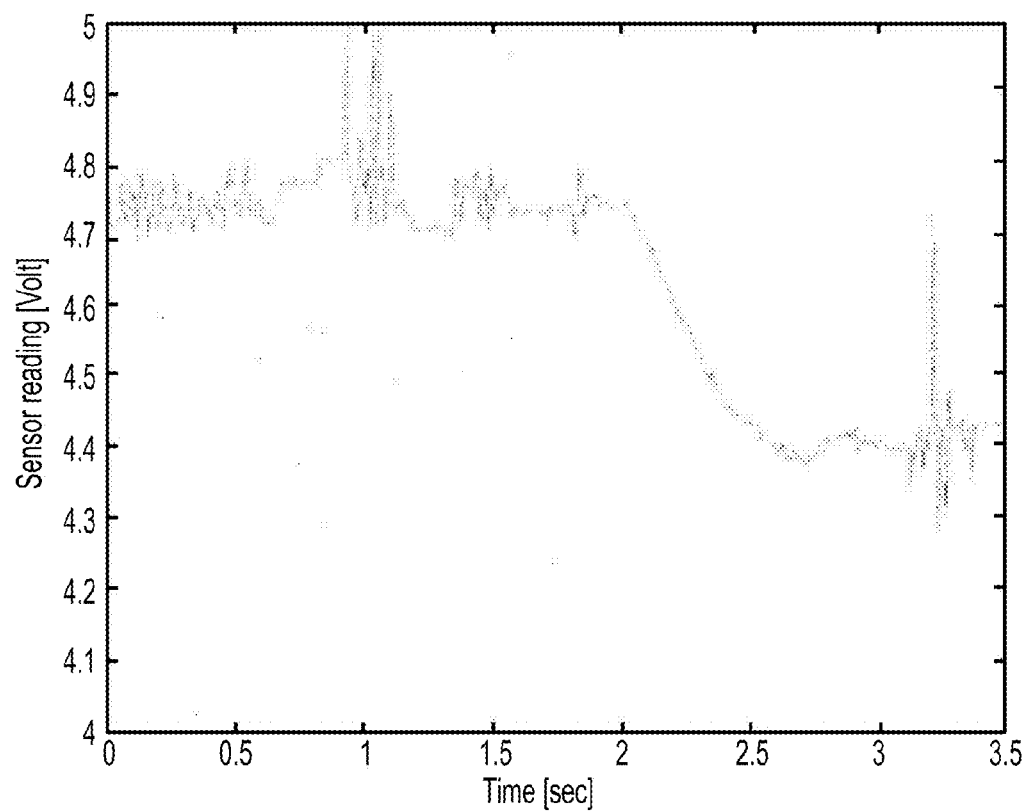
FIG. 14D schematically illustrates experimental results for a robust controller—with a negative step reference introduced approximately at t=2 sec, in accordance with an embodiment of the present invention.
Figure 14E:
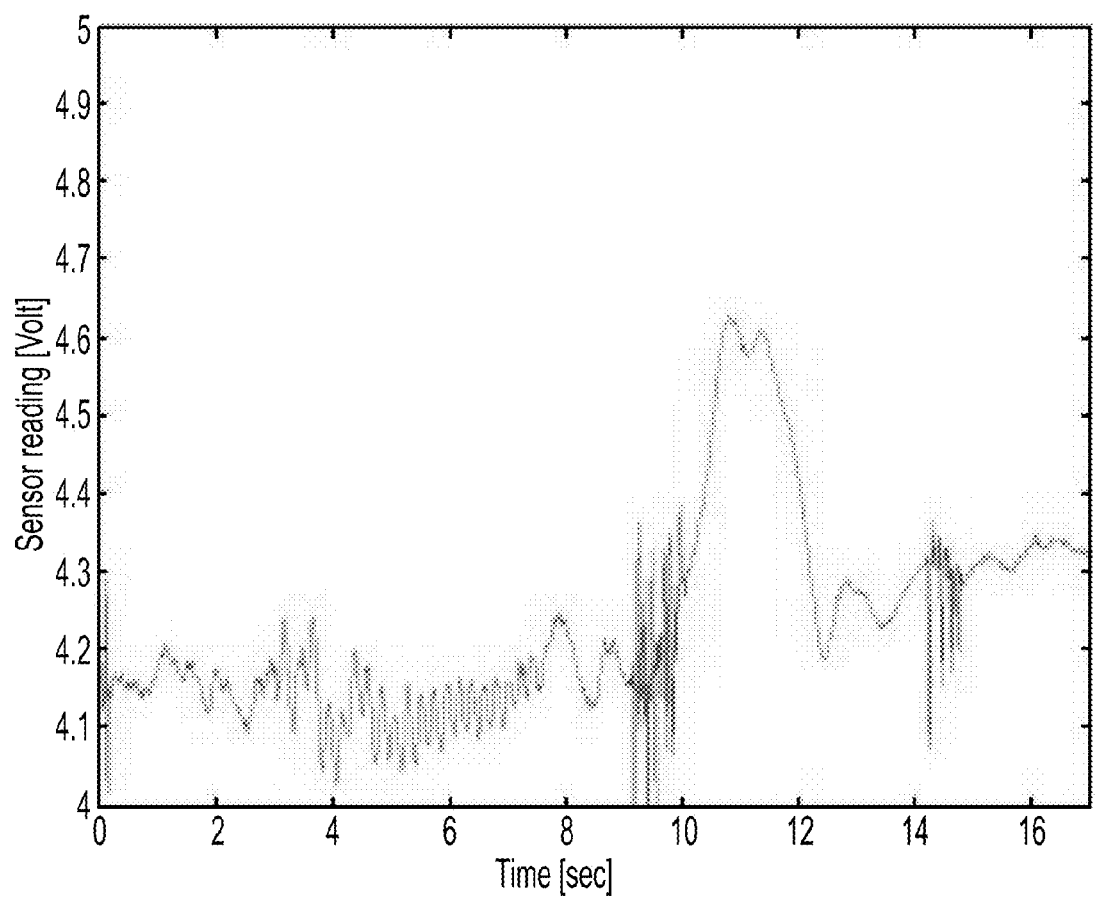
FIG. 14E schematically illustrates experimental results for a robust controller—with a roll command remaining constant for approximately 10 sec, followed by a turn of approximately 2 sec, after which the motorcycle was stabilized at a new roll angle, in accordance with an embodiment of the present invention.

Due to the lack of memory of the on-board micro-controller sensor readings and actuator commands could not be stored for future analysis. However, for some of the tests an additional data-logger was installed on the motorcycle, which enabled recording the roll angle at a 100 [Hz] sampling rate. FIGS. 14A and 14B show the readings of two runs during which the roll angle and the velocities commands were constant (remote control joystick in neutral and end-of-course position, respectively). During a second run the carburetor regime changed very sporadically in an uncontrolled fashion, which caused the spikes in the roll angle readings. It can be seen that the motorcycle remained stable despite these sudden velocity changes. FIGS. 14C and 14D show the response to positive and negative steps introduced around t=1.1 second and t=2 second, respectively. In both cases the response time is less than 1 second. Finally, FIG. 14E shows a longer sequence during which the roll command remained constant for about 10 seconds, followed by a turn that lasted about 2 seconds, after which the motorcycle was stabilized at new roll angle. FIG. 14A shows a sensor reading in volts on the vertical axis in a range from 0-5 volts and time in sec on the horizontal axis in a range from 0-8 sec, FIG. 14B shows a sensor reading in volts on the vertical axis in a range from 0-5 volts and time in sec on the horizontal axis in a range from 0-6 sec, FIG. 14C shows a sensor reading in volts on the vertical axis in a range from 0-5 volts and time in sec on the horizontal axis in a range from 0-3 sec, FIG. 14D shows a sensor reading in volts on the vertical axis in a range from 0-5 volts and time in sec on the horizontal axis in a range from 0-3.5 sec, and FIG. 14E shows a sensor reading in volts on the vertical axis in a range from 0-5 volts and time in sec on the horizontal axis in a range from 0-17 sec.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for stabilizing a single-track vehicle including a front assembly and a rear assembly, said system comprising:
   a robust controller including an inner loop which closes on a roll angular rate $\dot{\chi}$ of said rear assembly and reduces parametric uncertainty associated with said vehicle, and an outer loop which closes on a roll angle $\chi$ of said rear assembly, and wherein the robust controller outputs a steering torque signal for controlling a steering angle in said front assembly;
   a roll angle sensor for measuring the roll angle in the rear assembly;
   a roll rate gyro for measuring the roll angular rate in the rear assembly; and
   a motor for applying the steering angle to said front assembly responsive to the steering torque signal.

2. The system of claim 1 wherein the inner loop includes a plant comprising known parameters of the motor.

3. The system of claim 1 wherein the inner loop includes a plant comprising known parameters of said vehicle.

4. The system of claim 1 wherein the inner loop includes a plant comprising unknown parameters of said vehicle.

5. The system of claim 1 wherein the parametric uncertainty associated with said vehicle includes variations in physical parameters in the vehicle.

6. The system of claim 1 wherein the parametric uncertainty associated with said vehicle includes variations in an operating range of forward velocity.

7. The system of claim 1 wherein the outer loop includes a plant comprising an integrator.

8. The system of claim 1 wherein the robust controller includes a prefilter.

9. A single-track vehicle including a front assembly and a rear assembly, said vehicle comprising:
   a system for stabilizing a single-track vehicle including a front assembly and a rear assembly, the system comprising a robust controller including an inner loop which closes on a roll angular rate $\dot{\chi}$ of said rear assembly and reduces parametric uncertainty associated with said vehicle, and an outer loop which closes on a roll angle $\chi$ of said rear assembly, and wherein the robust controller outputs a steering torque signal for controlling a steering angle in said front assembly; a roll angle sensor for measuring the roll angle in the rear assembly; a roll rate gyro for measuring the roll angular rate in the rear assembly; and a motor for applying the steering angle to said front assembly responsive to the steering torque signal.

10. The single-track vehicle of claim 9 further comprising a throttle actuator for controlling gas an engine included in said vehicle.

11. The single-track vehicle of claim 9 further comprising a brake actuator for braking said vehicle.

12. A method for stabilizing a single-track vehicle including a front assembly and a rear assembly, said method comprising:
- closing on a roll angular rate $\dot{\chi}$ of said rear assembly and reducing parametric uncertainty associated with said vehicle, in an inner loop of a robust controller;
- closing on a roll angle $\chi$ of said rear assembly in an outer loop of the robust controller;
- producing a steering torque signal for controlling a steering angle in said front assembly;
- measuring the roll angle in the rear assembly;
- measuring the roll angular rate in the rear assembly; and
- applying the steering angle to said front assembly responsive to the steering torque signal.

13. The method of claim 12 further comprising applying a reference roll angle step input to the robust controller.

14. The method of claim 13 further comprising prefiltering the reference roll angle step input.

15. The method of claim 13 further comprising converting the reference roll angle step input from a time domain to a frequency domain.

16. The method of claim 12 further comprising including known parameters of said vehicle in a plant in the inner loop.

17. The method of claim 12 further comprising including uncertain parameters of said vehicle in a plant in the inner loop.

18. The method of claim 12 wherein the parametric uncertainty associated with said vehicle includes variations in physical parameters in the vehicle.

19. The method of claim 12 wherein the parametric uncertainty associated with said vehicle includes variations in an operating range of forward velocity.

20. The method of claim 12 further comprising including a plant comprising an integrator in the outer loop.

21. The method of claim 12 further comprising including known parameters of the motor in a plant in the inner loop.

* * * * *